United States Patent
Peters et al.

(10) Patent No.: US 9,056,786 B2
(45) Date of Patent: *Jun. 16, 2015

(54) LOW DENSITY AND HIGH STRENGTH FIBER GLASS FOR BALLISTIC APPLICATIONS

(75) Inventors: James Carl Peters, Shelby, NC (US); Juan Camilo Serrano, Gastonia, NC (US); Hong Li, Sewickley, PA (US); Cheryl A. Richards, Monroeville, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 910 days.

This patent is subject to a terminal disclaimer.

(21) Appl. No.: 13/232,576

(22) Filed: Sep. 14, 2011

(65) Prior Publication Data

US 2012/0060678 A1 Mar. 15, 2012

Related U.S. Application Data

(63) Continuation-in-part of application No. 13/229,012, filed on Sep. 9, 2011, now Pat. No. 8,697,591, which is a continuation-in-part of application No. 12/940,764, filed on Nov. 5, 2010, now Pat. No. 8,697,590, which is a continuation of application No. 11/610,761, filed on Dec. 14, 2006, now Pat. No. 7,829,490.

(60) Provisional application No. 61/382,794, filed on Sep. 14, 2010.

(51) Int. Cl.
| | |
|---|---|
| *F41H 5/02* | (2006.01) |
| *C08L 63/00* | (2006.01) |
| *C08L 23/12* | (2006.01) |
| *C08L 23/06* | (2006.01) |
| *C08L 69/00* | (2006.01) |
| *D03D 11/00* | (2006.01) |
| *C08L 77/00* | (2006.01) |
| *C08L 75/04* | (2006.01) |
| *C08L 61/06* | (2006.01) |
| *C08L 31/02* | (2006.01) |
| *D03D 25/00* | (2006.01) |
| *D03D 13/00* | (2006.01) |
| *C08L 67/02* | (2006.01) |
| *C03C 13/00* | (2006.01) |
| *B29C 70/06* | (2006.01) |
| *B29C 70/22* | (2006.01) |
| *B29C 70/24* | (2006.01) |
| *F41H 5/04* | (2006.01) |
| *B29K 309/08* | (2006.01) |

(52) U.S. Cl.
CPC .............. *C03C 13/00* (2013.01); *B29C 70/06* (2013.01); *B29C 70/22* (2013.01); *B29C 70/24* (2013.01); *B29K 2309/08* (2013.01); *F41H 5/0471* (2013.01)

(58) Field of Classification Search
CPC ........ B29C 70/10; B29C 70/22; B29C 70/24; B29C 70/06; B29K 2309/08; C03C 13/00; F41H 5/0471
See application file for complete search history.

(56) References Cited

U.S. PATENT DOCUMENTS

| | | |
|---|---|---|
| 3,008,841 A | 11/1961 | Tiede |
| 4,582,748 A | 4/1986 | Eastes et al. |
| 4,824,806 A | 4/1989 | Yokoi et al. |
| 5,348,916 A | 9/1994 | Kushitani et al. |
| 5,369,195 A | 11/1994 | Kelsey |
| 5,958,808 A | 9/1999 | Mori et al. |
| 6,060,168 A | 5/2000 | Kohli |
| 6,169,047 B1 | 1/2001 | Nishizawa et al. |
| 6,462,147 B1 * | 10/2002 | Arata et al. ............ 525/486 |
| 6,537,937 B1 | 3/2003 | Nishizawa et al. |
| 6,846,761 B2 | 1/2005 | Tamura |
| 6,858,552 B2 | 2/2005 | Peuchert |
| 6,867,158 B2 | 3/2005 | Peuchert et al. |
| 7,727,916 B2 | 6/2010 | Peuchert et al. |
| 7,754,631 B2 | 7/2010 | Maehara et al. |
| 7,829,490 B2 | 11/2010 | Li et al. |
| 8,129,299 B2 | 3/2012 | Kishimoto et al. |
| 8,697,590 B2 | 4/2014 | Li et al. |

(Continued)

FOREIGN PATENT DOCUMENTS

| | | |
|---|---|---|
| CA | 2 672 222 | 6/2008 |
| CA | 2 748 000 | 7/2010 |

(Continued)

OTHER PUBLICATIONS

Machine translation of Kawamoto et al. (JP 2003-137590). (Japanese version provided by Applicant.).*
Machine translation of Yabuuchi et al. (JP 06-219780). (Japanese version provided by Applicant.).*
Lowenstein, K., Glass Science and Technology 6, The Manufacturing Technology of Continuous Glass Fibres, Third, completely revised edition, 1993, pp. 33 & 113.
Matsumoto, M. et al., New Low Dielectric Glass (NE-Glass) Fiber Woven Materials for Next Generation Board, ECWC 8, Tokyo 99, p. 2-3-1 thru p. 2-3-4.

(Continued)

*Primary Examiner* — Ling Choi
*Assistant Examiner* — Catherine S Branch
(74) *Attorney, Agent, or Firm* — Kilpatrick Townsend & Stockton LLP

(57) ABSTRACT

The present invention relates to fabrics, composites, prepregs, laminates, and other products incorporating glass fibers formed from glass compositions. The glass fibers, in some embodiments, are incorporated into composites that can be adapted for use in high energy impact applications such as ballistic or blast resistance applications. Glass fibers formed from some embodiments of the glass compositions can have certain desirable properties that can include, for example, desirable electrical properties (e.g. low $D_k$) or desirable mechanical properties (e.g., specific strength).

22 Claims, No Drawings

(56) References Cited

U.S. PATENT DOCUMENTS

| | | | |
|---|---|---|---|
| 8,697,591 | B2 | 4/2014 | Li et al. |
| 2002/0193027 | A1* | 12/2002 | Dana et al. ............ 442/285 |
| 2003/0054936 | A1 | 3/2003 | Tamura |
| 2004/0175557 | A1 | 9/2004 | Creux et al. |
| 2004/0220039 | A1 | 11/2004 | Peuchert |
| 2005/0101469 | A1 | 5/2005 | Peuchert et al. |
| 2006/0003884 | A1 | 1/2006 | Nishizawa et al. |
| 2006/0160691 | A1 | 7/2006 | Kawaguchi et al. |
| 2007/0209401 | A1 | 9/2007 | Berthereau et al. |
| 2007/0213194 | A1 | 9/2007 | Abensour et al. |
| 2008/0146430 | A1 | 6/2008 | Li et al. |
| 2009/0170684 | A1 | 7/2009 | Kato et al. |
| 2011/0053755 | A1 | 3/2011 | Li et al. |
| 2011/0318561 | A1 | 12/2011 | Murata et al. |
| 2012/0058878 | A1 | 3/2012 | Li et al. |
| 2012/0060679 | A1 | 3/2012 | Peters et al. |
| 2012/0064788 | A1 | 3/2012 | Peters et al. |
| 2012/0095149 | A1 | 4/2012 | Sawanoi et al. |
| 2013/0029830 | A1 | 1/2013 | Koyama et al. |
| 2013/0037105 | A1 | 2/2013 | Aitken et al. |

FOREIGN PATENT DOCUMENTS

| | | |
|---|---|---|
| DE | 14 96 520 | 8/1969 |
| DE | 10 2005 019 958 A1 | 11/2006 |
| EP | 0 344 693 | 12/1989 |
| EP | 0 831 072 | 6/1996 |
| GB | 1 006 524 | 10/1965 |
| GB | 1 057 383 | 2/1967 |
| JP | 6-211543 | 8/1994 |
| JP | 6-219780 | 8/1994 |
| JP | 3-409806 | 1/1995 |
| JP | 7-010598 | 1/1995 |
| JP | 2002-080240 | 3/2002 |
| JP | 2002-137937 | 5/2002 |
| JP | 2002-137938 | 5/2002 |
| JP | 2002-154843 | 5/2002 |
| JP | 2002-220255 | 8/2002 |
| JP | 2002-338295 | 11/2002 |
| JP | 2003-137590 | 5/2003 |
| JP | 2003-171143 | 6/2003 |
| JP | 2003-321247 | 11/2003 |
| JP | 2009-286686 A | 12/2009 |
| WO | WO 99-52833 | 10/1999 |
| WO | WO 2005/092808 | 10/2005 |
| WO | WO 2008073585 A1 | 6/2008 |

OTHER PUBLICATIONS

Navias, L. et al., Dielectric Properties of Glasses at Ultra-High Frequencies and their Relation to Composition, Journal of American Ceramic Society, 1946, vol. 29, No. 10, pp. 267-276.

E, R, and D Glass Properties, Technical Data Sheet, Saint-Gobain Vetrotex, 2002.

Search Results for International Application No. PCT/US2007/082337 dated Feb. 5, 2008.

Written Opinion of the International Searching Authority for International Application No. PCT/US2007/082337 dated Feb. 5, 2008.

International Preliminary Report on Patentability for International Application PCT/US2007/082337 dated Jun. 16, 2009.

Patent Cooperation Treaty, International Search Report, International Application No. PCT/US2011/051532, mailed Dec. 27, 2011.

Patent Cooperation Treaty, International Preliminary Report on Patentability, International Application No. PCT/US2011/051532, mailed Mar. 28, 2013.

United States Patent and Trademark Office, Office Action, U.S. Appl. No. 12/940,764, mailed Apr. 23, 2013.

United States Patent and Trademark Office, Office Action, U.S. Appl. No. 13/229,012, mailed Apr. 24, 2013.

United States Patent and Trademark Office, Office Action, U.S. Appl. No. 13/232,316, mailed Apr. 29, 2013.

United States Patent and Trademark Office, Office Action, U.S. Appl. No. 13/232,614 dated Aug. 5, 2014.

United States Patent and Trademark Office, Response to Office Action, U.S. Appl. No. 13/232,316, filed May 20, 2013.

United States Patent and Trademark Office, Office Action, U.S. Appl. No. 13/232,316, mailed Aug. 27, 2013.

United States Patent and Trademark Office, Response to Office Action, U.S. Appl. No. 13/232,316, filed Nov. 26, 2013.

United States Patent and Trademark Office, Office Action, U.S. Appl. No. 13/232,316, mailed Feb. 10, 2014.

United States Patent and Trademark Office, Response to Office Action, U.S. Appl. No. 13/232,316, filed May 12, 2014.

United States Patent and Trademark Office, Office Action, U.S. Appl. No. 13/232,316, mailed May 28, 2014.

United States Patent and Trademark Office, Pre-Appeal Brief Request for Conference, U.S. Appl. No. 13/232,316, filed Jun. 10, 2014.

United States Patent and Trademark Office, Office Action, U.S. Appl. No. 13/232,316, mailed Jul. 11, 2014.

United States Patent and Trademark Office, Request for Continued Examination, U.S. Appl. No. 13/232,316, filed Aug. 11, 2014.

United States Patent and Trademark Office, Response to Office Action, U.S. Appl. No. 12/940,764, filed Jul. 18, 2013.

United States Patent and Trademark Office, Office Action, U.S. Appl. No. 12/940,764, mailed Aug. 5, 2013.

United States Patent and Trademark Office, Response to Office Action, U.S. Appl. No. 12/940,764, filed Nov. 5, 2013.

United States Patent and Trademark Office, Response to Office Action, U.S. Appl. No. 13/229,012, filed Oct. 22, 2013.

United States Patent and Trademark Office, Amendment and Response to Office Action, U.S. Appl. No. 13/232,614 dated Nov. 4, 2014.

United States Patent and Trademark Office, Office Action, U.S. Appl. No. 13/232,316 mailed Oct. 20, 2014.

* cited by examiner

LOW DENSITY AND HIGH STRENGTH FIBER GLASS FOR BALLISTIC APPLICATIONS

CROSS-REFERENCE TO RELATED APPLICATIONS

This application claims priority to U.S. Provisional Patent Application Ser. No. 61/382,794, filed on Sep. 14, 2010, the entire disclosure of which is hereby incorporated by reference. This application claims priority to and is a continuation-in-part of U.S. patent application Ser. No. 13/229,012, filed on Sep. 9, 2011, now U.S. Pat. No. 8,697,591, which issued Apr. 15, 2014 and which is a continuation-in-part of U.S. patent application Ser. No. 12/940,764, filed on Nov. 5, 2010, now U.S. Pat. No. 8,697,590, which issued Apr. 15, 2014 and which is a continuation of U.S. patent application Ser. No. 11/610,761, filed on Dec. 14, 2006, now U.S. Pat. No. 7,829,490, which issued Nov. 9, 2010, the contents of which are each hereby incorporated by reference in their entireties.

STATEMENT REGARDING FEDERALLY SPONSORED RESEARCH OR DEVELOPMENT

This invention was made with government support under contract W911NF-09-9-0003 awarded by the Army Research Laboratory. The government has certain rights in the invention.

FIELD OF INVENTION

The present invention relates to composites comprising glass fibers adapted for use in high energy impact applications such as ballistic or blast resistance applications.

BACKGROUND

Materials operable to withstand high energy impacts from various sources, such as projectiles and blast compression waves, find use in a wide range of applications, including civilian and military structural reinforcement applications and armored vehicle applications. Ceramic plates and reinforced composite materials, for example, have been used to shield vehicles from potential damage caused by various explosive devices. Predicting which materials will exhibit desirable properties for use in ballistic applications is notoriously difficult, however.

Glass fibers have been used to reinforce various polymeric resins for many years. Some commonly used glass compositions for use in reinforcement applications include the "E-glass" and "D-glass" families of compositions. Another commonly used glass composition is commercially available from AGY (Aiken, S.C.) under the trade name "S-2 Glass." However, reinforcing polymeric resins with glass fibers for high energy impact applications such as ballistic or blast resistance applications does not necessarily result in composites having other desirable mechanical properties as well.

In general, glass fibers can be produced from small streams of molten glass extruded through small orifices located in a bushing. The fibers of molten glass which issue from the bushing are attenuated to a desired diameter by pulling the fibers until the desired diameter is achieved, during which time the fibers cool and solidify. These cooled fibers or filaments can then be coated with a sizing that can impart desired properties. As used herein, the term "sizing" refers to a coating composition applied to fiber glass filaments immediately after forming, and the term may be used interchangeably with the terms "size," "sizing composition," "primary sizing," "binder composition," and "binder." After their formation and treatment, the sized glass fibers can be gathered into bundles or strands comprising a plurality of individual fibers. Similarly, bundles or strands can be further gathered into rovings comprising a plurality of bundles or strands. Continuous strands or rovings can be wound upon a spool to form a package. Lengths of strands or rovings can then be dispensed from the spool as needed.

SUMMARY

Various embodiments of the present invention relate generally to low density and high strength glass fibers, and to fiber glass strands, yarns, fabrics, composites, and armor panels comprising low density and high strength glass fibers adapted for use in ballistic or blast resistance applications.

In one embodiment, a composite of the present invention comprises a polymeric resin and a plurality of glass fibers disposed in the polymeric resin, wherein at least one of the plurality of glass fibers comprises a glass composition comprising:

| | |
|---|---|
| $SiO_2$ | 60-68 weight percent; |
| $B_2O_3$ | 7-12 weight percent; |
| $Al_2O_3$ | 9-15 weight percent; |
| MgO | 8-15 weight percent; |
| CaO | 0-4 weight percent; |
| $Li_2O$ | 0-2 weight percent; |
| $Na_2O$ | 0-1 weight percent; |
| $K_2O$ | 0-1 weight percent; |
| $Fe_2O_3$ | 0-1 weight percent; |
| $F_2$ | 0-1 weight percent; |
| $TiO_2$ | 0-2 weight percent; and |
| other constituents | 0-5 weight percent total, | wherein the ($Li_2O+Na_2O+K_2O$) content is less than 2 weight percent, wherein the MgO content is at least twice the content of CaO on a weight percent basis, and wherein the composite is adapted for use in ballistics or blast resistance applications.

In another embodiment, a composite of the present invention comprises a polydicyclopentadiene resin and a plurality of glass fibers disposed in the polydicyclopentadiene resin, wherein at least one of the plurality of glass fibers comprises a glass composition comprising

| | |
|---|---|
| $SiO_2$ | 53.5-77 weight percent; |
| $B_2O_3$ | 4.5-14.5 weight percent; |
| $Al_2O_3$ | 4.5-18.5 weight percent; |
| MgO | 4-12.5 weight percent; |
| CaO | 0-10.5 weight percent; |
| $Li_2O$ | 0-4 weight percent; |
| $Na_2O$ | 0-2 weight percent; |
| $K_2O$ | 0-1 weight percent; |
| $Fe_2O_3$ | 0-1 weight percent; |
| $F_2$ | 0-2 weight percent; |
| $TiO_2$ | 0-2 weight percent; and |
| other constituents | 0-5 weight percent total; | wherein the composite is adapted for use in ballistics or blast resistance applications.

In some embodiments, composites of the present invention can exhibit a 0.30 cal FSP $V_{50}$ value of at least about 900 fps at an areal density of about 2 lb/ft² and a thickness of about 5-6 mm when measured by the U.S. Department of Defense Test Method Standard for $V_{50}$ Ballistic Test for Armor, MIL-STD-662F, December 1997. Composites of the present invention, in some embodiments, can exhibit a 0.50 cal FSP $V_{50}$ value of at least about 1200 fps at an areal density of about 4.8-4.9 lb/ft² and a thickness of about 13-13.5 mm when measured by the U.S. Department of Defense Test Method Standard for $V_{50}$ Ballistic Test for Armor, MIL-STD-662F, December 1997.

The polymeric resin that can be used in some embodiments of the present invention comprises an epoxy resin. In some embodiments, the polymeric resin can comprise at least one of polyethylene, polypropylene, polyamide, polybutylene terephthalate, polycarbonate, thermoplastic polyurethane, phenolic, polyester, vinyl ester, and thermoset polyurethane resins.

In some embodiments, the plurality of glass fibers used in the composite are arranged to form a fabric. The plurality of glass fibers used in some embodiments of composites of the present invention are woven to form a fabric. Such fabrics can include, in some embodiments, a plain weave fabric, a twill fabric, a crowfoot fabric, a satin weave fabric, a stitch bonded fabric, or a 3D woven fabric.

Some embodiments of the present invention relate to armor panels comprising composites of the present invention.

These and other embodiments are discussed in greater detail in the detailed description which follows.

DETAILED DESCRIPTION

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains errors necessarily resulting from the standard deviation found in applicable testing measurements.

It is further noted that, as used in this specification, the singular forms "a," "an," and "the" include plural referents unless expressly and unequivocally limited to one referent.

Fiberizable glass compositions have been developed which provide improved electrical performance (i.e., low dielectric constant, Dk, and/or low dissipation factor, Df) relative to standard E-glass, while providing temperature-viscosity relationships that are more conducive to commercially practical fiber forming than previous low Dk glass proposals. Such glass compositions are described in U.S. Pat. No. 7,829,490 and U.S. patent application Ser. No. 13/229,012, filed Sep. 9, 2011, both of which are incorporated herein by reference in their entireties. Another optional aspect of the glass compositions described in U.S. Pat. No. 7,829,490 and U.S. patent application Ser. No. 13/229,012 is that at least some of the compositions can be made commercially with relatively low raw material batch cost.

Some embodiments of the present invention relate to composites comprising glass fibers. Composites of the present invention, in some embodiments, are suitable for use in high mechanical stress applications, including, but not limited to, high energy impact applications. In some embodiments, for example, a composite of the present invention comprises a polymeric resin and a plurality of glass fibers disposed in the polymeric resin. Glass fibers useful in some embodiments of the present invention can exhibit properties especially desirable for high energy impact applications such as ballistic or blast resistance applications. Compared to glass fibers comprising E-glass, glass fibers useful in some embodiments of the present invention can exhibit high strain-to-failure, high strength, and/or low fiber density, which combination can result in glass fiber-reinforced composites having a lower areal density for a given fiber volume fraction or a given composite performance.

In some embodiments, composites of the present invention can be suitable for use in armor applications. For example, some embodiments of composites can be used in the production of armor panels. In some embodiments, a composite of the present invention can be formed into a panel, wherein the panel can exhibit a 0.30 cal FSP ("fragment simulating projectile") $V_{50}$ value of at least about 900 feet per second (fps) at a panel areal density of about 2 lb/ft² and a panel thickness of about 5-6 mm when measured by the U.S. Department of Defense Test Method Standard for $V_{50}$ Ballistic Test for Armor, MIL-STD-662F, December 1997 (hereinafter "MIL-STD-662F"), the entirety of which is incorporated herein by reference. In this context, the term "composite" refers generically to a material comprising a polymeric resin and a plurality of glass fibers disposed in the polymeric resin, whereas the term "panel" refers to a composite having sheet-like physical dimensions or shape. In other embodiments, a composite of the present invention can be formed into a panel, wherein the panel can exhibit a 0.50 cal FSP $V_{50}$ value of at least about 1200 fps at a panel areal density of about 4.8-4.9 lb/ft² and a panel thickness of about 13-13.5 mm when measured by MIL-STD-662F. As $V_{50}$ values can depend on the panel areal density and the panel thickness, composites of the present invention can have different $V_{50}$ values depending on how the panel is constructed. One advantage of some embodiments of the present invention is the provision of composites having higher $V_{50}$ values than similarly constructed composites assembled using E-glass fibers.

In some embodiments, a composite of the present invention comprises a polymeric resin and a plurality of glass fibers disposed in the polymeric resin, wherein at least one of the plurality of glass fibers comprises a glass composition that comprises the following components:

| | |
|---|---|
| $SiO_2$ | 60-68 weight percent; |
| $B_2O_3$ | 7-12 weight percent; |
| $Al_2O_3$ | 9-15 weight percent; |
| $MgO$ | 8-15 weight percent; |
| $CaO$ | 0-4 weight percent; |
| $Li_2O$ | 0-2 weight percent; |
| $Na_2O$ | 0-1 weight percent; |
| $K_2O$ | 0-1 weight percent; |
| $Fe_2O_3$ | 0-1 weight percent; |
| $F_2$ | 0-1 weight percent; |
| $TiO_2$ | 0-2 weight percent; and |
| other constituents | 0-5 weight percent total; | wherein the composite is adapted for use in ballistics or blast resistance applications. In some embodiments, the ($Li_2O$+$Na_2O$+$K_2O$) content can be less than 2 weight percent and the MgO content can be at least twice the content of CaO on a weight percent basis. In other embodiments, the $Li_2O$ content can be greater than either the $Na_2O$ content or the $K_2O$ content.

In some embodiments, a composite of the present invention comprises a polymeric resin and a plurality of glass fibers disposed in the polymeric resin, wherein at least one of the plurality of glass fibers comprises a glass composition that comprises the following components:

| | | |
|---|---|---|
| $SiO_2$ | 53.5-77 | weight percent; |
| $B_2O_3$ | 4.5-14.5 | weight percent; |
| $Al_2O_3$ | 4.5-18.5 | weight percent; |
| MgO | 4-12.5 | weight percent; |
| CaO | 0-10.5 | weight percent; |
| $Li_2O$ | 0-4 | weight percent; |
| $Na_2O$ | 0-2 | weight percent; |
| $K_2O$ | 0-1 | weight percent; |
| $Fe_2O_3$ | 0-1 | weight percent; |
| $F_2$ | 0-2 | weight percent; |
| $TiO_2$ | 0-2 | weight percent; and |
| other constituents | 0-5 | weight percent total; | wherein the composite is adapted for use in ballistics or blast resistance applications. In some embodiments, the ($Li_2O+Na_2O+K_2O$) content can be less than 2 weight percent and the MgO content can be at least twice the content of CaO on a weight percent basis. In other embodiments, the $Li_2O$ content can be greater than either the $Na_2O$ content or the $K_2O$ content.

A number of other glass compositions are disclosed herein, and other embodiments of the present invention relate to composites comprising a plurality of glass fibers formed from such compositions.

Some embodiments of the present invention relate to panels, such as armor panels, comprising composites of the present invention. In some embodiments, a composite of the present invention can be formed into a panel, wherein the panel exhibits a 0.30 cal FSP $V_{50}$ value of at least about 900 fps at a panel areal density of about 2 lb/ft² and a panel thickness of about 5-6 mm when measured by MIL-STD-662F. In other embodiments, a composite of the present invention can be formed into a panel, wherein the panel exhibits a 0.30 cal FSP $V_{50}$ value of at least about 1000 fps at a panel areal density of about 2 lb/ft² and a panel thickness of about 5-6 mm when measured by MIL-STD-662F. In still other embodiments of the present invention, a composite can be formed into a panel, wherein the panel exhibits a 0.30 cal FSP $V_{50}$ value of at least about 1100 fps at a panel areal density of about 2 lb/ft² and a panel thickness of about 5-6 mm when measured MIL-STD-662F. In some embodiments of the present invention, a composite can be formed into a panel, wherein the panel exhibits a 0.30 cal FSP $V_{50}$ value of about 900 fps to about 1140 fps at a panel areal density of about 2 lb/ft² and a panel thickness of about 5-6 mm when measured by MIL-STD-662F.

In some embodiments, a composite of the present invention can be formed into a panel, wherein the panel exhibits a 0.50 cal FSP $V_{50}$ value of at least about 1200 fps at a panel areal density of about 4.8-4.9 lb/ft² and a panel thickness of about 13-13.5 mm when measured by MIL-STD-662F. In other embodiments of the present invention, a composite can be formed into a panel, wherein the panel exhibits a 0.50 cal FSP $V_{50}$ value of at least about 1300 fps at a panel areal density of about 4.8-4.9 lb/ft² and a panel thickness of about 13-13.5 mm when measured by MIL-STD-662F. In still other embodiments of the present invention, a composite can be formed into a panel, wherein the panel exhibits a 0.50 cal FSP $V_{50}$ value of at least about 1400 fps at a panel areal density of about 4.8-4.9 lb/ft² and a panel thickness of about 13-13.5 mm when measured by MIL-STD-662F. In some embodiments of the present invention, a composite can be formed into a panel, wherein the panel exhibits a 0.50 cal FSP $V_{50}$ value of about 1200 fps to about 1440 fps at a panel areal density of about 4.8-4.9 lb/ft² and a panel thickness of about 13-13.5 mm when measured by MIL-STD-662F.

Composites of the present invention can comprise various polymeric resins, depending on the desired properties and applications. In some embodiments of the present invention, a composite comprises a polymeric resin and a plurality of glass fibers disposed in the polymeric resin, wherein at least one of the plurality of glass fibers comprises a glass composition as disclosed herein, the composite can be formed into a panel, such as an armor panel for ballistic or blast resistance, and the polymeric resin comprises an epoxy resin. A composite of the present invention, in some embodiments, comprises a polymeric resin and a plurality of glass fibers disposed in the polymeric resin, wherein at least one of the plurality of glass fibers comprises a glass composition as disclosed herein, the composite can be formed into a panel, such as an armor panel for ballistic or blast resistance, and the polymeric resin comprises a polydicyclopentadiene resin. In some embodiments of the present invention, the polymeric resin can comprise polyethylene, polypropylene, polyamides (including Nylon), polybutylene terephthalate, polycarbonate, thermoplastic polyurethane, phenolic, polyester, vinyl ester, thermoset polyurethane, cyanate esters, or bis-maleimide resins.

In some embodiments of the present invention, a composite comprises a polymeric resin and a plurality of glass fibers disposed in the polymeric resin, wherein at least one of the plurality of glass fibers comprises a glass composition as disclosed herein, the composite can be formed into a panel, such as an armor panel for ballistic or blast resistance, and at least one of the plurality of glass fibers is at least partially coated with a sizing composition. In some embodiments of the present invention, the sizing composition can be compatible with the polymeric resin.

In some embodiments of the present invention, a composite comprises a polymeric resin and a plurality of glass fibers disposed in the polymeric resin, wherein at least one of the plurality of glass fibers comprises a glass composition as disclosed herein, the composite can be formed into a panel, such as an armor panel for ballistic or blast resistance, and the plurality of glass fibers are arranged to form a fabric. In some embodiments of the present invention comprising a plurality of glass fibers arranged to form a fabric, the composite can be formed into a panel, wherein the panel exhibits a 0.30 cal FSP $V_{50}$ value of at least about 1000 fps at a panel areal density of about 2 lb/ft² and a panel thickness of about 5-6 mm when measured by MIL-STD-662F. In other embodiments of the present invention comprising a plurality of glass fibers arranged to form a fabric, the composite can be formed into a panel, wherein the panel exhibits a 0.30 cal FSP $V_{50}$ value of at least about 1100 fps at a panel areal density of about 2 lb/ft² and a panel thickness of about 5-6 mm when measured by MIL-STD-662F. In still other embodiments of the present invention comprising a plurality of glass fibers arranged to form a fabric, the composite can be formed into a panel, wherein the panel exhibits a 0.30 cal FSP $V_{50}$ value of about 900 fps to about 1140 fps at a panel areal density of about 2 lb/ft² and a panel thickness of about 5-6 mm when measured by MIL-STD-662F. In some embodiments of the present invention comprising a plurality of glass fibers arranged to form a fabric, the composite can be formed into a panel, wherein the panel exhibits a 0.50 cal FSP $V_{50}$ value of at least about 1200 fps at a panel areal density of about 4.8-4.9 lb/ft² and a panel thickness of about 13-13.5 mm when measured by MIL-STD-662F. In other embodiments of the present invention comprising a plurality of glass fibers arranged to form a fabric, the composite can be formed into a panel, wherein the panel exhibits a 0.50 cal FSP $V_{50}$ value of at least about 1300 fps at a panel areal density of about 4.8-4.9 lb/ft² and a panel thickness of about 13-13.5 mm when measured by MIL-STD-662F. In still other embodiments of the present invention comprising a plurality of glass fibers arranged to form a fabric, the composite can be formed into a panel, wherein the panel exhibits a 0.50 cal FSP $V_{50}$ value of at least about 1400 fps at a panel areal density of about 4.8-4.9 lb/ft² and a panel thickness of about 13-13.5 mm when measured by MIL-STD-662F. In some embodiments of the present invention comprising a plurality of glass fibers arranged to form a fabric, a composite can be formed into a panel, wherein the panel exhibits a 0.50 cal FSP $V_{50}$ value of about 1200 fps to about 1440 fps at a panel areal density of about 4.8-4.9 lb/ft² and a panel thickness of about 13-13.5 mm when measured by MIL-STD-662F.

In some embodiments of the present invention comprising a plurality of glass fibers arranged to form a fabric, the plurality of glass fibers are woven to form the fabric. In other embodiments of the present invention, the glass fiber fabric comprises a plain weave fabric, a twill fabric, a crowfoot fabric, a satin weave fabric, a stitch bonded fabric (also known as a non-crimp fabric), or a "three-dimensional" woven fabric.

In some embodiments of the present invention comprising a plurality of glass fibers arranged to form a fabric, the polymeric resin comprises an epoxy resin. In some embodiments of the present invention comprising a plurality of glass fibers arranged to form a fabric, the polymeric resin comprises a polydicyclopentadiene resin. In some embodiments of the present invention, the polymeric resin comprises polyethylene, polypropylene, polyamides (including Nylon), polybutylene terephthalate, polycarbonate, thermoplastic polyurethane, phenolic, polyester, vinyl ester, thermoset polyurethane, cyanate esters, or bis-maleimide resins.

Glass fibers useful in the present invention can be made by any suitable method known to one of ordinary skill in the art, such as but not limited to the method described above herein. Glass fiber fabrics useful in the present invention can generally be made by any suitable method known to one of ordinary skill in the art, such as but not limited to interweaving weft yarns (also referred to as "fill yarns") into a plurality of warp yarns. Such interweaving can be accomplished by positioning the warp yarns in a generally parallel, planar array on a loom, and thereafter weaving the weft yarns into the warp yarns by passing the weft yarns over and under the warp yarns in a predetermined repetitive pattern. The pattern used depends upon the desired fabric style.

Warp yarns can generally be prepared using techniques known to those of skill in the art. Warp yarns can be formed by attenuating a plurality of molten glass streams from a bushing or spinner. Thereafter, a sizing composition can be applied to the individual glass fibers and the fibers can be gathered together to form a strand. The single end strands can be subsequently processed into assembled rovings by gathering several ends together and providing a small level of twist. Occasionally, the bundle integrity is increased by treatment with water or steam. The gathered multi-end strand can then be wound onto a 3" cardboard spool. At this point the spools can be used for warp or weft feed by tying the strand ends into a traditional rapier loom for fabric weaving into the predetermined style.

Composites of the present invention can be prepared by any suitable method known to one of ordinary skill in the art, such as but not limited to vacuum assisted resin infusion molding, extrusion compounding, compression molding, resin transfer molding, reaction injection molding, and pultrusion. Composites of the present invention can be prepared using such molding techniques as known to those of ordinary skill in the art.

Some composites of the present invention can be made using vacuum assisted resin infusion technology, as further described herein. A stack of glass fiber fabrics of the present invention may be cut to a desired size and placed on a silicone release treated glass table. The stack may then be covered with a peel ply, fitted with a flow enhancing media, and vacuum bagged using nylon bagging film. Next, the so-called "lay up" may be subjected to a vacuum pressure of about 27 inches Hg. Separately, the polymeric resin that is to be reinforced with the fiber glass fabrics can be prepared using techniques known to those of skill in the art for that particular resin. For example, for some polymeric resins, an appropriate resin (e.g., an amine-curable epoxy resin) may be mixed with an appropriate curing agent (e.g., an amine for an amine-curable epoxy resin) in the proportions recommended by the resin manufacturer or otherwise known to a person of ordinary skill in the art. The combined resin may then be degassed in a vacuum chamber for 30 minutes and infused through the fabric preform until substantially complete wet out of the fabric stack is achieved. At this point, the tool is set to a temperature of about 45-50° C. for 24 hours. The resulting rigid composites may then be de-molded and post cured at about 250° F. for 4 hours in a programmable convection oven. As is known to persons of ordinary skill in the art, however, various parameters such as degassing time, heating time, and post curing conditions may vary based on the specific resin system used, and persons of ordinary skill in the art understand how to select such parameters based on a particular resin system.

In some embodiments of composites of the present invention where the polymer resin comprises polydicyclopentadiene, such composites can also be made using vacuum assisted resin infusion technology as described below. A stack of glass fiber fabrics of the present invention may be cut to a desired size and placed on a silicone release treated glass table. The stack may then be covered with a peel ply, fitted with a flow enhancing media, and vacuum bagged using nylon bagging film. Next, the so-called "lay up" may be subjected to a vacuum pressure of about 27 inches Hg. Separately, the polydicyclopentadiene resin that is to be reinforced with the fiber glass fabrics can be prepared using techniques known to those of skill in the art. For example, for polydicyclopentadiene resins, the resin is mixed with the proper amount of catalyst, and in some cases an inhibitor, in the proportions recommended by the pDCPD supplier or otherwise known to a person of ordinary skill in the art. The DCPD resin may then be degassed in a vacuum chamber for 30 minutes and infused through the fabric preform until substantially complete wet out of the fabric stack is achieved. At this point, the tool is set to a temperature of about 120° C. for up to 4 hours. The resulting rigid composites may then be de-molded. As is known to persons of ordinary skill in the art, however, various parameters such as degassing time, heating time, and post curing conditions may vary based on the specific resin system used, and persons of ordinary skill in the art understand how to select such parameters based on a particular resin system.

As noted above, composites of the present invention can comprise a plurality of glass fibers. Glass fibers suitable for use in the present invention can have any appropriate diameter known to one of ordinary skill in the art, depending on the desired application. Glass fibers suitable for use in some embodiments of the present invention have a diameter of about 5 to about 12 µm. Glass fibers suitable for use in other embodiments of the present invention have a diameter of about 6 µm. For example, in some embodiments where glass fibers are to be used in composites for use in high energy impact applications such as ballistic or blast resistance applications, the glass fibers can have a diameter of about 6 µm, although other glass fiber diameters could also be used.

In addition, glass fibers and glass fiber strands suitable for use in the present invention can comprise a variety of glass compositions. Some embodiments of such glass fibers and fiber glass strands are set forth above and others are described below. As noted above, one example of glass fiber or fiber glass strand suitable for use in some embodiments of the present invention comprises a glass composition comprising

| | |
|---|---|
| $SiO_2$ | 60-68 weight percent; |
| $B_2O_3$ | 7-12 weight percent; |
| $Al_2O_3$ | 9-15 weight percent; |
| MgO | 8-15 weight percent; |
| CaO | 0-4 weight percent; |
| $Li_2O$ | 0-2 weight percent; |
| $Na_2O$ | 0-1 weight percent; |
| $K_2O$ | 0-1 weight percent; |
| $Fe_2O_3$ | 0-1 weight percent; |
| $F_2$ | 0-1 weight percent; |
| $TiO_2$ | 0-2 weight percent; and |
| other constituents | 0-5 weight percent total. |

Another example of a glass fiber or fiber glass strand suitable for use in some embodiments of the present invention comprises a glass composition comprising

| | |
|---|---|
| $SiO_2$ | 60-68 weight percent; |
| $B_2O_3$ | 7-12 weight percent; |
| $Al_2O_3$ | 9-15 weight percent; |
| MgO | 8-15 weight percent; |
| CaO | 0-4 weight percent; |
| $Li_2O$ | >0-2 weight percent; |
| $Na_2O$ | 0-1 weight percent; |
| $K_2O$ | 0-1 weight percent; |
| $Fe_2O_3$ | 0-1 weight percent; |
| $F_2$ | 0-1 weight percent; |
| $TiO_2$ | 0-2 weight percent; and |
| other constituents | 0-5 weight percent total; | wherein the $Li_2O$ content is greater than either the $Na_2O$ content or the $K_2O$ content. In other embodiments, the CaO content is 0-3 weight percent. In still other embodiments, the CaO content is 0-2 weight percent. In some embodiments, the CaO content is 0-1 weight percent. In some embodiments of the present invention, the MgO content is 8-13 weight percent. In other embodiments, the MgO content is 9-12 weight percent. In some embodiments, the $TiO_2$ content is 0-1 weight percent. In some embodiments, the $B_2O_3$ content is no more than 10 weight percent. In some embodiments of the present invention, the $Al_2O_3$ content is 9-14 weight percent. In other embodiments, the $Al_2O_3$ content is 10-13 weight percent. In some embodiments, the ($Li_2O+Na_2O+K_2O$) content is less than 2 weight percent. In some embodiments, the composition contains 0-1 weight percent of BaO and 0-2 weight percent ZnO. In other embodiments, the composition contains essentially no BaO and essentially no ZnO. In some embodiments, other constituents, if any, are present in a total amount of 0-2 weight percent. In other embodiments, other constituents, if any, are present in a total amount of 0-1 weight percent. In some embodiments, the $Li_2O$ content is 0.4-2.0 weight percent. In other embodiments comprising a $Li_2O$ content of 0.4-2.0 weight percent, the $Li_2O$ content is greater than the ($Na_2O+K_2O$) content.

Another example of a glass fiber or fiber glass strand suitable for use in some embodiments of the present invention comprises a glass composition comprising

| | |
|---|---|
| $SiO_2$ | 60-68 weight percent; |
| $B_2O_3$ | 7-13 weight percent; |
| $Al_2O_3$ | 9-15 weight percent; |
| MgO | 8-15 weight percent; |
| CaO | 0-4 weight percent; |
| $Li_2O$ | 0-2 weight percent; |
| $Na_2O$ | 0-1 weight percent; |
| $K_2O$ | 0-1 weight percent; |
| $Fe_2O_3$ | 0-1 weight percent; |
| $F_2$ | 0-1 weight percent; and |
| $TiO_2$ | 0-2 weight percent. |

In some embodiments, the glass compositions are characterized by relatively low content of CaO, for example on the order of about 0-4 weight percent. In yet other embodiments, the CaO content can be on the order of about 0-3 weight percent. In some embodiments, the MgO content is double that of the CaO content (on a weight percent basis). Some embodiments of the invention can have a MgO content greater than about 6.0 weight percent, and in other embodiments the MgO content can be greater than about 7.0 weight percent. Some glass compositions suitable for use in some embodiments of the present invention can be characterized by the presence of less than 1.0 weight percent BaO. In those embodiments in which only trace impurity amounts of BaO are present, the BaO content can be characterized as being no more than 0.05 weight percent.

Another example of a glass fiber or fiber glass strand suitable for use in some embodiments of the present invention comprises a glass composition comprising

| | |
|---|---|
| $SiO_2$ | 60-68 weight percent; |
| $B_2O_3$ | 7-12 weight percent; |
| $Al_2O_3$ | 9-15 weight percent; |
| MgO | 8-15 weight percent; |
| CaO | 0-4 weight percent; |
| $Li_2O$ | >0-2 weight percent; |
| $Na_2O$ | 0-1 weight percent; |
| $K_2O$ | 0-1 weight percent; |
| $Fe_2O_3$ | 0-1 weight percent; |
| $F_2$ | 0-1 weight percent; |
| $TiO_2$ | 0-2 weight percent; and |
| other constituents | 0-5 weight percent total; | wherein the $Li_2O$ content is greater than either the $Na_2O$ content or the $K_2O$ content, and wherein the constituents are selected to provide a glass having a dielectric constant ($D_k$) less than 6.7 at 1 MHz frequency. In other embodiments, the constituents are selected to provide a glass having a dielectric constant ($D_k$) less than 6 at 1 MHz frequency. In still other embodiments, the constituents are selected to provide a glass having a dielectric constant ($D_k$) less than 5.8 at 1 MHz frequency. In some embodiments, the constituents are selected to provide a glass having a dielectric constant ($D_k$) less than 5.6 at 1 MHz frequency.

The constituents of a glass composition suitable for use in some embodiments of the present invention can be selected based on a desired forming temperature (defined as the temperature at which the viscosity is 1000 poise) and/or a desired liquidus temperature. In some embodiments, a glass fiber or fiber glass strand suitable for use in the present invention comprises a glass composition comprising

| | |
|---|---|
| $SiO_2$ | 60-68 weight percent; |
| $B_2O_3$ | 7-12 weight percent; |
| $Al_2O_3$ | 9-15 weight percent; |
| MgO | 8-15 weight percent; |

| | |
|---|---|
| CaO | 0-4 weight percent; |
| Li$_2$O | >0-2 weight percent; |
| Na$_2$O | 0-1 weight percent; |
| K$_2$O | 0-1 weight percent; |
| Fe$_2$O$_3$ | 0-1 weight percent; |
| F$_2$ | 0-1 weight percent; |
| TiO$_2$ | 0-2 weight percent; and |
| other constituents | 0-5 weight percent total; | wherein the Li$_2$O content is greater than either the Na$_2$O content or the K$_2$O content, and wherein the constituents are selected to provide a forming temperature T$_F$ at 1000 poise viscosity no greater than 1370° C. In other embodiments, the constituents are selected to provide a forming temperature T$_F$ at 1000 poise viscosity no greater than 1320° C. In still other embodiments, the constituents are selected to provide a forming temperature T$_F$ at 1000 poise viscosity no greater than 1300° C. In some embodiments, the constituents are selected to provide a forming temperature T$_F$ at 1000 poise viscosity no greater than 1290° C. In some embodiments, the constituents are selected to provide a forming temperature T$_F$ at 1000 poise viscosity no greater than 1370° C. and a liquidus temperature T$_L$ at least 55° C. below the forming temperature. In other embodiments, the constituents are selected to provide a forming temperature T$_F$ at 1000 poise viscosity no greater than 1320° C. and a liquidus temperature T$_L$ at least 55° C. below the forming temperature. In still other embodiments, the constituents are selected to provide a forming temperature T$_F$ at 1000 poise viscosity no greater than 1300° C. and a liquidus temperature T$_L$ at least 55° C. below the forming temperature. In some embodiments, the constituents are selected to provide a forming temperature T$_F$ at 1000 poise viscosity no greater than 1290° C. and a liquidus temperature T$_L$ at least 55° C. below the forming temperature.

Another example of a glass fiber or fiber glass strand suitable for use in some embodiments of the present invention comprises a glass composition comprising

| | |
|---|---|
| B$_2$O$_3$ | less than 12 weight percent; |
| Al$_2$O$_3$ | 9-15 weight percent; |
| MgO | 8-15 weight percent; |
| CaO | 0-4 weight percent; |
| SiO$_2$ | 60-68 weight percent; |
| Li$_2$O | >0-2 weight percent; |
| Na$_2$O | 0-1 weight percent; |
| K$_2$O | 0-1 weight percent; |
| Fe$_2$O$_3$ | 0-1 weight percent; |
| F$_2$ | 0-1 weight percent; and |
| TiO$_2$ | 0-2 weight percent; | wherein the glass exhibits a dielectric constant (D$_k$) less than 6.7 and forming temperature (T$_F$) at 1000 poise viscosity no greater than 1370° C. and wherein the Li$_2$O content is greater than either the Na$_2$O content or the K$_2$O content. In some embodiments, the CaO content is 0-1 weight percent.

Another example of a glass fiber or fiber glass strand suitable for use in some embodiments of the present invention comprises a glass composition comprising

| | |
|---|---|
| SiO$_2$ | 60-68 weight percent; |
| B$_2$O$_3$ | 7-12 weight percent; |
| Al$_2$O$_3$ | 9-15 weight percent; |
| MgO | 8-15 weight percent; |
| CaO | 0-3 weight percent; |
| Li$_2$O | 0.4-2 weight percent; |
| Na$_2$O | 0-1 weight percent; |
| K$_2$O | 0-1 weight percent; |
| Fe$_2$O$_3$ | 0-1 weight percent; |
| F$_2$ | 0-1 weight percent; and |
| TiO$_2$ | 0-2 weight percent; | wherein the glass exhibits a dielectric constant (D$_k$) less than 5.9 and forming temperature (T$_F$) at 1000 poise viscosity no greater than 1300° C. and wherein the Li$_2$O content is greater than either the Na$_2$O content or the K$_2$O content.

Another example of a glass fiber or fiber glass strand suitable for use in some embodiments of the present invention comprises a glass composition consisting essentially of

| | |
|---|---|
| SiO$_2$ | 60-68 weight percent; |
| B$_2$O$_3$ | 7-11 weight percent; |
| Al$_2$O$_3$ | 9-13 weight percent; |
| MgO | 8-13 weight percent; |
| CaO | 0-3 weight percent; |
| Li$_2$O | 0.4-2 weight percent; |
| Na$_2$O | 0-1 weight percent; |
| K$_2$O | 0-1 weight percent; |
| (Na$_2$O + K$_2$O + Li$_2$O) | 0-2 weight percent; |
| Fe$_2$O$_3$ | 0-1 weight percent; |
| F$_2$ | 0-1 weight percent; and |
| TiO$_2$ | 0-2 weight percent; | wherein the Li$_2$O content is greater than either the Na$_2$O content or the K$_2$O content. In some embodiments, the CaO content is 0-1 weight percent. In some embodiments comprising a CaO content of 0-1 weight percent, the B$_2$O$_3$ content is no more than 10 weight percent.

Another example of a glass fiber or fiber glass strand suitable for use in some embodiments of the present invention comprises a glass composition comprising

| | |
|---|---|
| SiO$_2$ | 60-68 weight percent; |
| B$_2$O$_3$ | 7-10 weight percent; |
| Al$_2$O$_3$ | 9-15 weight percent; |
| MgO | 8-15 weight percent; |
| CaO | 0-4 weight percent; |
| Li$_2$O | >0-2 weight percent; |
| Na$_2$O | 0-1 weight percent; |
| K$_2$O | 0-1 weight percent; |
| Fe$_2$O$_3$ | 0-1 weight percent; |
| F$_2$ | 0-1 weight percent; |
| TiO$_2$ | 0-2 weight percent; and |
| other constituents | 0-5 weight percent; | wherein the Li$_2$O content is greater than either the Na$_2$O content or the K$_2$O content. In some embodiments, the constituents are selected to provide a glass having a dielectric constant (D$_k$) less than 6.7 at 1 MHz frequency. In other embodiments, the constituents are selected to provide a glass having a dielectric constant (D$_k$) less than 6 at 1 MHz frequency. In still other embodiments, the constituents are selected to provide a glass having a dielectric constant (D$_k$) less than 5.8 at 1 MHz frequency. In some embodiments, the constituents are selected to provide a glass having a dielectric constant (D$_k$) less than 5.6 at 1 MHz frequency.

Another example of a glass fiber or fiber glass strand suitable for use in some embodiments of the present invention comprises a glass composition comprising:

| | |
|---|---|
| SiO$_2$ | 53.5-77 weight percent; |
| B$_2$O$_3$ | 4.5-14.5 weight percent; |

| | |
|---|---|
| $Al_2O_3$ | 4.5-18.5 weight percent; |
| MgO | 4-12.5 weight percent; |
| CaO | 0-10.5 weight percent; |
| $Li_2O$ | 0-4 weight percent; |
| $Na_2O$ | 0-2 weight percent; |
| $K_2O$ | 0-1 weight percent; |
| $Fe_2O_3$ | 0-1 weight percent; |
| $F_2$ | 0-2 weight percent; |
| $TiO_2$ | 0-2 weight percent; and |
| other constituents | 0-5 weight percent total. |

Another example of a glass fiber or fiber glass strand suitable for use in some embodiments of the present invention comprises a glass composition comprising:

| | |
|---|---|
| $SiO_2$ | 60-77 weight percent; |
| $B_2O_3$ | 4.5-14.5 weight percent; |
| $Al_2O_3$ | 4.5-18.5 weight percent; |
| MgO | 8-12.5 weight percent; |
| CaO | 0-4 weight percent; |
| $Li_2O$ | 0-3 weight percent; |
| $Na_2O$ | 0-2 weight percent; |
| $K_2O$ | 0-1 weight percent; |
| $Fe_2O_3$ | 0-1 weight percent; |
| $F_2$ | 0-2 weight percent; |
| $TiO_2$ | 0-2 weight percent; and |
| other constituents | 0-5 weight percent total. |

Another example of a glass fiber or fiber glass strand suitable for use in some embodiments of the present invention comprises a glass composition comprising:

| | |
|---|---|
| $SiO_2$ | at least 60 weight percent; |
| $B_2O_3$ | 5-11 weight percent; |
| $Al_2O_3$ | 5-18 weight percent; |
| MgO | 5-12 weight percent; |
| CaO | 0-10 weight percent; |
| $Li_2O$ | 0-3 weight percent; |
| $Na_2O$ | 0-2 weight percent; |
| $K_2O$ | 0-1 weight percent; |
| $Fe_2O_3$ | 0-1 weight percent; |
| $F_2$ | 0-2 weight percent; |
| $TiO_2$ | 0-2 weight percent; and |
| other constituents | 0-5 weight percent total. |

Another example of a glass fiber or fiber glass strand suitable for use in some embodiments of the present invention comprises a glass composition comprising:

| | |
|---|---|
| $SiO_2$ | 60-68 weight percent; |
| $B_2O_3$ | 5-10 weight percent; |
| $Al_2O_3$ | 10-18 weight percent; |
| MgO | 8-12 weight percent; |
| CaO | 0-4 weight percent; |
| $Li_2O$ | 0-3 weight percent; |
| $Na_2O$ | 0-2 weight percent; |
| $K_2O$ | 0-1 weight percent; |
| $Fe_2O_3$ | 0-1 weight percent; |
| $F_2$ | 0-2 weight percent; |
| $TiO_2$ | 0-2 weight percent; and |
| other constituents | 0-5 weight percent total. |

Another example of a glass fiber or fiber glass strand suitable for use in some embodiments of the present invention comprises a glass composition comprising:

| | |
|---|---|
| $SiO_2$ | 62-68 weight percent; |
| $B_2O_3$ | 7-9 weight percent; |
| $Al_2O_3$ | 11-18 weight percent; |
| MgO | 8-11 weight percent; |
| CaO | 1-2 weight percent; |
| $Li_2O$ | 1-2 weight percent; |
| $Na_2O$ | 0-0.5 weight percent; |
| $K_2O$ | 0-0.5 weight percent; |
| $Fe_2O_3$ | 0-0.5 weight percent; |
| $F_2$ | 0.5-1 weight percent; |
| $TiO_2$ | 0-1 weight percent; and |
| other constituents | 0-5 weight percent total. |

Another example of a glass fiber or fiber glass strand suitable for use in some embodiments of the present invention comprises a glass composition comprising:

| | |
|---|---|
| $SiO_2$ | 62-68 weight percent; |
| $B_2O_3$ | less than about 9 weight percent; |
| $Al_2O_3$ | 10-18 weight percent; |
| MgO | 8-12 weight percent; and |
| CaO | 0-4 weight percent; | wherein the glass exhibits a dielectric constant ($D_k$) less than 6.7 and a forming temperature ($T_F$) at 1000 poise viscosity no greater than 1370° C.

Another example of a glass fiber or fiber glass strand suitable for use in some embodiments of the present invention comprises a glass composition comprising:

| | |
|---|---|
| $B_2O_3$ | less than 14 weight percent; |
| $Al_2O_3$ | 9-15 weight percent; |
| MgO | 8-15 weight percent; |
| CaO | 0-4 weight percent; and |
| $SiO_2$ | 60-68 weight percent; | wherein the glass exhibits a dielectric constant ($D_k$) less than 6.7 and forming temperature ($T_F$) at 1000 poise viscosity no greater than 1370° C.

Another example of a glass fiber or fiber glass strand suitable for use in some embodiments of the present invention comprises a glass composition comprising:

| | |
|---|---|
| $B_2O_3$ | less than 9 weight percent; |
| $Al_2O_3$ | 11-18 weight percent; |
| MgO | 8-11 weight percent; |
| CaO | 1-2 weight percent; and |
| $SiO_2$ | 62-68 weight percent; | wherein the glass exhibits a dielectric constant ($D_k$) less than 6.7 and forming temperature ($T_F$) at 1000 poise viscosity no greater than 1370° C.

Another example of a glass fiber or fiber glass strand suitable for use in some embodiments of the present invention comprises a glass composition comprising:

| | |
|---|---|
| $SiO_2$ | 60-68 weight percent; |
| $B_2O_3$ | 7-13 weight percent; |
| $Al_2O_3$ | 9-15 weight percent; |
| MgO | 8-15 weight percent; |
| CaO | 0-3 weight percent; |
| $Li_2O$ | 0.4-2 weight percent; |
| $Na_2O$ | 0-1 weight percent; |
| $K_2O$ | 0-1 weight percent; |
| $Fe_2O_3$ | 0-1 weight percent; |
| $F_2$ | 0-1 weight percent; and |
| $TiO_2$ | 0-2 weight percent; | wherein the glass exhibits a dielectric constant ($D_k$) less than 5.9 and forming temperature ($T_F$) at 1000 poise viscosity no greater than 1300° C.

Another example of a glass fiber or fiber glass strand suitable for use in some embodiments of the present invention comprises a glass composition comprising:

| | |
|---|---|
| $SiO_2$ | 60-68 weight percent; |
| $B_2O_3$ | 7-11 weight percent; |
| $Al_2O_3$ | 9-13 weight percent; |
| MgO | 8-13 weight percent; |
| CaO | 0-3 weight percent; |
| $Li_2O$ | 0.4-2 weight percent; |
| $Na_2O$ | 0-1 weight percent; |
| $K_2O$ | 0-1 weight percent; |
| ($Na_2O + K_2O + Li_2O$) | 0-2 weight percent; |
| $Fe_2O_3$ | 0-1 weight percent; |
| $F_2$ | 0-1 weight percent; and |
| $TiO_2$ | 0-2 weight percent. |

In addition to or instead of the features of the invention described above, some embodiments of the glass compositions described herein can be utilized to provide glasses having dissipation factors ($D_f$) lower than standard electronic E-glass. In some embodiments, $D_F$ may be no more than 0.0150 at 1 GHz, and in other embodiments no more than 0.0100 at 1 GHz.

In some embodiments of glass compositions, $D_F$ is no more than 0.007 at 1 GHz, and in other embodiments no more than 0.003 at 1 GHz, and in yet other embodiments no more than 0.002 at 1 GHz.

In some embodiments, the glass compositions that can be used in glass fibers or fiber glass strands are characterized by relatively low content of CaO, for example, on the order of about 0-4 weight percent. In yet other embodiments, the CaO content can be on the order of about 0-3 weight percent. In yet other embodiments, the CaO content can be on the order of about 0-2 weight percent. In general, minimizing the CaO content yields improvements in electrical properties, and the CaO content has been reduced to such low levels in some embodiments that it can be considered an optional constituent. In some other embodiments, the CaO content can be on the order of about 1-2 weight percent.

On the other hand, the MgO content is relatively high for glasses of this type, wherein in some embodiments the MgO content is double that of the CaO content (on a weight percent basis). Some embodiments can have MgO content greater than about 5.0 weight percent, and in other embodiments the MgO content can be greater than 8.0 weight percent. In some embodiments, the compositions are characterized by a MgO content, for example, on the order of about 8-13 weight percent. In yet other embodiments, the MgO content can be on the order of about 9-12 weight percent. In some other embodiments, the MgO content can be on the order of about 8-12 weight percent. In yet some other embodiments, the MgO content can be on the order of about 8-10 weight percent.

In some embodiments, the compositions that can be used in glass fibers or fiber glass strands are characterized by a (MgO+CaO) content, for example, that is less than 16 weight percent. In yet other embodiments, the (MgO+CaO) content is less than 13 weight percent. In some other embodiments, the (MgO+CaO) content is 7-16 weight percent. In yet some other embodiments, the (MgO+CaO) content can be on the order of about 10-13 weight percent.

In yet some other embodiments, the compositions can be characterized by a ratio of (MgO+CaO)/($Li_2O+Na_2O+K_2O$) content on the order of about 9.0. In certain embodiments, the ratio of $Li_2O$/(MgO+CaO) content can be on the order of about 0-2.0. In yet some other embodiments, the ratio of $Li_2O$/(MgO+CaO) content can be on the order of about 1-2.0. In certain embodiments, the ratio of $Li_2O$/(MgO+CaO) content can be on the order of about 1.0.

In some other embodiments, the ($SiO_2+B_2O_3$) content can be on the order of 70-76 weight percent. In yet other embodiments, the ($SiO_2+B_2O_3$) content can be on the order of 70 weight percent. In other embodiments, the ($SiO_2+B_2O_3$) content can be on the order of 73 weight percent. In still other embodiments, the ratio of the weight percent of $Al_2O_3$ to the weigh percent of $B_2O_3$ is on the order of 1-3. In some other embodiments, the ratio of the weight percent of $Al_2O_3$ to the weight percent of $B_2O_3$ is on the order of 1.5-2.5. In certain embodiments, the $SiO_2$ content is on the order of 65-68 weight percent.

As noted above, some low $D_k$ compositions of the prior art have the disadvantage of requiring the inclusion of substantial amounts of BaO, and it can be noted that BaO is not required in some embodiments of glass compositions for use in some embodiments of the present invention. Although the advantageous electrical and manufacturing properties of the invention do not preclude the presence of BaO, the absence of deliberate inclusions of BaO can be considered an additional advantage of some embodiments of the present invention. Thus, embodiments of the present invention can be characterized by the presence of less than 1.0 weight percent BaO. In those embodiments in which only trace impurity amounts are present, the BaO content can be characterized as being no more than 0.05 weight percent.

The compositions that can be used in some embodiments of the invention include $B_2O_3$ in amounts less that the prior art approaches that rely upon high $B_2O_3$ to achieve low $D_k$. This results in significant cost savings. In some embodiments the $B_2O_3$ content need be no more than 13 weight percent, or no more than 12 weight percent. Some embodiments of the invention also fall within the ASTM definition of electronic E-glass, i.e., no more than 10 weight percent $B_2O_3$.

In some embodiments, the compositions are characterized by a $B_2O_3$ content, for example, on the order of about 5-11 weight percent. In some embodiments, the $B_2O_3$ content can be 6-11 weight percent. The $B_2O_3$ content, in some embodiments, can be 6-9 weight percent. In some embodiments, the $B_2O_3$ content can be 5-10 weight percent. In some other embodiments, the $B_2O_3$ content is not greater than 9 weight percent. In yet some other embodiments, the $B_2O_3$ content is not greater than 8 weight percent.

In some embodiments, the compositions that can be used in some embodiments of the present invention are characterized by a $Al_2O_3$ content, for example on the order of about 5-18 weight percent. The $Al_2O_3$ content, in some embodiments, can be 9-18 weight percent. In yet other embodiments, the $Al_2O_3$ content is on the order of about 10-18 weight percent. In some other embodiments, the $Al_2O_3$ content is on the order of about 10-16 weight percent. In yet some other embodiments, the $Al_2O_3$ content is on the order of about 10-14 weight percent. In certain embodiments, the $Al_2O_3$ content is on the order of about 11-14 weight percent.

In some embodiments, $Li_2O$ is an optional constituent. In some embodiments, the compositions are characterized by a $Li_2O$ content, for example on the order of about 0.4-2.0 weight percent. In some embodiments, the $Li_2O$ content is greater than the ($Na_2O+K_2O$) content. In some embodiments, the ($Li_2O+Na_2O+K_2O$) content is not greater than 2 weight percent. In some embodiments, the ($Li_2O+Na_2O+K_2O$) content is on the order of about 1-2 weight percent.

In certain embodiments, the compositions of the invention are characterized by a $TiO_2$ content for example on the order of about 0-1 weight percent.

In some embodiments of the compositions set forth above, the constituents are proportioned so as to yield a glass having a dielectric constant lower than that of standard E-glass. With reference to a standard electronic E-glass for comparison, this may be less than about 6.7 at 1 MHz frequency. In other embodiments, the dielectric constant $(D_k)$ may be less than 6 at 1 MHz frequency. In other embodiments, the dielectric constant $(D_k)$ may be less than 5.8 at 1 MHz frequency. Further embodiments exhibit dielectric constants $(D_k)$ less than 5.6 or even lower at 1 MHz frequency. In other embodiments, the dielectric constant $(D_k)$ may be less than 5.4 at 1 MHz frequency. In yet other embodiments, the dielectric constant $(D_k)$ may be less than 5.2 at 1 MHz frequency. In yet other embodiments, the dielectric constant $(D_k)$ may be less than 5.0 at 1 MHz frequency.

The compositions set forth above can also possess desirable temperature-viscosity relationships conducive to practical commercial manufacture of glass fibers. In general, lower temperatures are required for making fibers compared to the D-glass type of composition in the prior art. The desirable characteristics may be expressed in a number of ways, and they may be attained by some embodiments of compositions described herein singly or in combination. For example, certain glass compositions within the ranges set forth above can be made that exhibit forming temperatures $(T_F)$ at 1000 poise viscosity no greater than 1370° C. The $T_F$ of some embodiments are no greater than 1320° C., or no greater than 1300° C., or no greater than 1290° C., or no greater than 1260° C., or no greater than 1250° C. These compositions can also encompass glasses in which the difference between the forming temperature and the liquidus temperature $(T_L)$ is positive, and in some embodiments the forming temperature is at least 55° C. greater than the liquidus temperature, which is advantageous for commercial manufacturing of fibers from these glass compositions.

In general, minimizing alkali oxide content of the glass compositions used to form the glass fibers or fiber glass strands can assist in lowering $D_k$. In those embodiments in which it is desired to optimize reduction of $D_k$ the total alkali oxide content may be no more than 2 weight percent of the glass composition. In some embodiments, it has been found that minimizing $Na_2O$ and $K_2O$ are more effective in this regard than $Li_2O$. The presence of alkali oxides generally results in lower forming temperatures. Therefore, in those embodiments of the invention in which providing relatively low forming temperatures is a priority, $Li_2O$ is included in significant amounts, e.g. at least 0.4 weight percent. For this purpose, in some embodiments the $Li_2O$ content is greater than either the $Na_2O$ or $K_2O$ contents, and in other embodiments the $Li_2O$ content is greater than the sum of the $Na_2O$ and $K_2O$ contents, in some embodiments greater by a factor of two or more.

One advantageous aspect in some of the embodiments is reliance upon constituents that are conventional in the fiber glass industry and avoidance of substantial amounts of constituents whose raw material sources are costly. For this aspect, constituents in addition to those explicitly set forth in the compositional definition of the glasses may be included even though not required, but in total amounts no greater than 5 weight percent. These optional constituents include melting aids, fining aids, colorants, trace impurities and other additives known to those of skill in glassmaking Relative to some prior art low $D_k$ glasses, no BaO is required in the compositions of the present invention, but inclusion of minor amounts of BaO (e.g., up to about 1 weight percent) would not be precluded. Likewise, major amounts of ZnO are not required in the present invention, but in some embodiments minor amounts (e.g., up to about 2.0 weight percent) may be included. In those embodiments of the invention in which optional constituents are minimized, the total of optional constituents is no more than 2 weight percent, or no more than 1 weight percent. Alternatively, some embodiments of the invention can be said to consist essentially of the named constituents.

The choice of batch ingredients and their cost are significantly dependent upon their purity requirements. Typical commercial ingredients, such as for E-glass making, contain impurities of $Na_2O$, $K_2O$, $Fe_2O_3$ or FeO, SrO, $F_2$, $TiO_2$, $SO_3$, etc. in various chemical forms. A majority of the cations from these impurities would increase the $D_k$ of the glasses by forming nonbridging oxygens with $SiO_2$ and/or $B_2O_3$ in the glass.

Sulfate (expressed as $SO_3$) may also be present as a refining agent. Small amounts of impurities may also be present from raw materials or from contamination during the melting processes, such as SrO, BaO, $Cl_2$, $P_2O_5$, $Cr_2O_3$, or NiO (not limited to these particular chemical forms). Other refining agents and/or processing aids may also be present such as $As_2O_3$, MnO, $MnO_2$, $Sb_2O_3$, or $SnO_2$, (not limited to these particular chemical forms). These impurities and refining agents, when present, are each typically present in amounts less than 0.5% by weight of the total glass composition. Optionally, elements from rare earth group of the Periodic Table of the Elements may be added to compositions of the present invention, including atomic numbers 21 (Sc), 39 (Y), and 57 (La) through 71 (Lu). These may serve as either processing aids or to improve the electrical, physical (thermal and optical), mechanical, and chemical properties of the glasses. The rare earth additives may be included with regard for the original chemical forms and oxidization states. Adding rare earth elements is considered optional, particularly in those embodiments of the present invention having the objective of minimizing raw material cost, because they would increase batch costs even at low concentrations. In any case, their costs would typically dictate that the rare earth components (measured as oxides), when included, be present in amounts no greater than about 0.1-1.0% by weight of the total glass composition.

Glass fibers, fiber glass strands, and other products incorporating such fibers or strands can exhibit desirable mechanical properties in some embodiments, particularly as compared to E-glass fibers, fiber glass strands formed from E-glass, and related products. Such mechanical properties may be beneficial in some embodiments of composites (or panels incorporating composites) of the present invention. For example, some embodiments of glass fibers can have relatively high specific strength or relatively high specific modulus, particularly, when compared to E-glass fibers. Specific strength refers to the tensile strength in $N/m^2$ divided by the specific weight in $N/m^3$. Specific modulus refers to the Young's modulus in $N/m^2$ divided by the specific weight in $N/m^3$. Glass fibers having relatively high specific strength and/or relatively high specific modulus may be desirable in ballistic or impact resistance applications where there is a desire to increase mechanical properties or product performance while reducing the overall weight of the composite.

As is known in the art, after formation, glass fibers are typically at least partially coated with a sizing composition. In general, glass fibers used to form composites of the present invention will be at least partially coated with a sizing composition. One skilled in the art may choose one of many commercially available sizing compositions for the glass fibers based upon a number of factors including, for example, performance properties of the sizing compositions, desired flexibility of the resulting fabric, cost, and other factors. Non-limiting examples of commercially available sizing compositions that can be used in some embodiments of the present invention include sizing compositions often used on single-end rovings, such as Hybon 2026, Hybon 2002, Hybon 1383, Hybon 2006, Hybon 2022, Hybon 2032, and Hybon 2016, TufRov 4588, as well as sizing compositions often used on yarns, such as 1383, 611, 900, 610, and 690, each of which refer to sizing compositions for products commercially available from PPG Industries, Inc. For glass fibers to be used in the reinforcement of polydicyclopentadiene resins, suitable sizing compositions can include Hybon 2026 or those sizing compositions described in U.S. Pat. No. 6,890,050, which is hereby incorporated by reference.

As noted above, composites of the present invention can comprise a plurality of glass fibers arranged to form a fabric, in some embodiments. Any suitable fabric design known to one of ordinary skill in the art for ballistic applications can be used. Suitable fabrics can include fabrics produced using standard textile equipment (e.g., rapier, projectile, or air jet looms). Non-limiting examples of such fabrics include plain weaves, twill, crowfoot, and satin weaves. Stitch bonded or non-crimp fabrics can also be used in some embodiments of the present invention. Such fabrics can include, for example, unidirectional, biaxial and triaxial non-crimp fabrics. In addition, 3D woven fabrics can also be used in some embodiments of the present invention. Such fabrics can be produced using multi-layer warp ends with shedding, either with the use of a dobby or a jacquard head.

As noted above, composites of the present invention can comprise warp and weft yarns. Any suitable warp and weft yarns known to one of ordinary skill in the art for ballistic applications may be used. In some embodiments, for example, warp yarns can comprise 250 yield assembled rovings produced by gathering several ends from G75 yarn, DE75 yarn, and/or DE150 yarns.

As noted above, composites of the present invention can comprise a polymeric resin, in some embodiments. A variety of polymeric resins can be used. Polymeric resins that are known to be useful in high energy impact applications such as ballistic or blast resistance applications, can be particularly useful in some embodiments. In some embodiments, the polymeric resin can comprise a thermoset resin. Thermoset resin systems useful in some embodiments of the present invention can include but are not limited to epoxy resin systems, phenolic based resins, polyesters, vinyl esters, thermoset polyurethanes, polydicyclopentadiene (pDCPD) resins, cyanate esters, and bis-maleimides. In some embodiments, the polymeric resin can comprise an epoxy resin. In some embodiments, the polymeric resin can comprise a polydicyclopentadiene resin. In other embodiments, the polymeric resin can comprise a thermoplastic resin. Thermoplastic polymers useful in some embodiments of the present invention include but are not limited to polyethylene, polypropylene, polyamides (including Nylon), polybutylene terephthalate, polycarbonate, and thermoplastic polyurethanes (TPU). Non-limiting examples of commercially available polymeric resins useful in some embodiments of the present invention include Hexion RIMR 135 epoxy with 1366 curing agent (available from Hexion Specialty Chemicals, Columbus, Ohio) and Applied Poleramic MMFCS2 epoxy (available from Applied Poleramic, Inc., Benicia, Calif.). Dicyclopentadiene resins useful in some embodiments of the present invention, along with catalysts and/or other materials useful in curing the resin, are commercially available from Materia, Inc. of Pasadena, Calif.

EXAMPLES

Some exemplary embodiments of the present invention will now be illustrated in the following specific, non-limiting examples.

Example 1

The physical properties of glass fibers useful in some embodiments of the present invention were measured under controlled processing conditions and are listed in Table 1. Physical properties from standard E-glass fibers are included for reference. "Specific Modulus" in Table 1 is the Young's modulus in $N/m^2$ divided by the specific weight in $N/m^3$, measured at a temperature of 296±2 K (23±2° C.) and a relative humidity of 50±5 percent. "Specific Tensile Strength" in Table 1 is the ultimate tensile strength in $N/m^2$ divided by specific weight in $N/m^3$, measured at a temperature of 296±2 K (23±2° C.). Single fiber tensile strengths were tested using a procedure based on ASTM D3379-75 (1989) e1 "Standard Test Method for Tensile Strength and Young's Modulus for High-Modulus Single-Filament Materials," as would be understood by one of ordinary skill in the art. The testing involved measuring/breaking 65-72 individual fibers made within 4 hours on the same day. As measured by x-ray fluorescence spectroscopy, the glass fibers of Sample 1 in Table 1 comprised a glass composition comprising

| | |
|---|---|
| $SiO_2$ | 65.80 weight percent; |
| $B_2O_3$ | 8.90 weight percent; |
| $Al_2O_3$ | 12.35 weight percent; |
| MgO | 10.27 weight percent; |
| CaO | 1.52 weight percent; |
| $Na_2O$ | 0.27 weight percent; |
| $K_2O$ | 0.13 weight percent; |
| $Fe_2O_3$ | 0.17 weight percent; |
| $F_2$ | 0.35 weight percent; |
| $TiO_2$ | 0.14 weight percent; |
| SrO | 0.02 weight percent; |
| $SO_3$ | 0.00 weight percent |
| ZrO | 0.06 weight percent; and |
| $Cr_2O_3$ | 0.01 weight percent. |

TABLE 1

Comparison of properties of E-glass and a glass composition useful in some embodiments of the present invention.

| | E-glass | Sample 1 |
|---|---|---|
| Forming Temp., $T_F$ (° C.) | 1157 | 1290 |
| Liquidus Temp., $T_L$ (° C.) | 1056 | 1220 |
| $T_F - T_L$ (° C.) | 101 | 70 |
| Refractive Index | 1.563 | 1.510 |
| Fiber Density (g/cm$^3$) | 2.59 | 2.41 |
| Fiber Tensile Strength (MPa) | 3221 | 3533 |
| Fiber Modulus (GPa) | 73 | 71.6 |
| Failure Strain (%) | 4.12 | 5.16 |
| Specific Tensile Strength ($10^{-3}$ m) | 118.51 | 156.13 |
| Specific Modulus ($10^{-6}$ m) | 2.87 | 3.03 |

Example 2

To evaluate the strength of some composites of the present invention, 8 oz/yd$^2$ unidirectional fabrics useful in some embodiments of the present invention were produced on a rapier loom and infused with high modulus epoxy resin (Hexion RIMR 135) for mechanical property characterization. The fabrics comprised E-225 yarns sized with a starch-oil sizing composition, and the yarns comprised glass fibers comprising the glass composition of Sample 1 in Table 1. Equivalent unidirectional fabric and composites were also produced with E-glass input as controls. Vacuum assisted resin infusion technology was used to make the composites comprising the unidirectional fabrics. To make a composite, a filament wound unidirectional fiber preform was cut to a desired size and placed on a silicone release treated glass table. The stack was then covered with a peel ply, fitted with a flow enhancing media, and vacuum bagged using nylon bagging film. Next, the so-called "preform" was subjected to a vacuum pressure of about 27 inches Hg. Separately, an amine-curable epoxy resin was mixed with an amine curing agent in the proportions recommended by the resin manufacturer. The combined resin was then degassed in a vacuum chamber for 30 minutes and infused through the fabric preform until complete wet out of the fabric stack was achieved. At this point, the table was covered with heated blankets (set to a temperature of about 45-50° C.) for 12 hours. The resulting rigid composites were then de-molded and post cured at about 176° F. for 5 hours in a programmable convection oven.

Some measured mechanical properties of composites of the present invention and control E-glass composites are shown below in Table 2. Where appropriate, the relevant standard ISO method is also listed for each mechanical property. The entirety of each of these standard methods is incorporated herein by reference. Table 2 shows the increased tensile performance of composites of the present invention compared to commercial E-glass fiber composites at equivalent fiber weight fractions.

TABLE 2

Comparison of properties of E-glass composites and composites of the present invention.

|  | ISO Method | E-Glass | Sample 2 |
|---|---|---|---|
| Tensile Strength |  |  |  |
| Mean (MPa) | ISO 527 | 350.4 | 390 |
| COV (%) | — | 4.34 | 3.08 |
| Specific Gravity | — | 1.78 | 1.73 |
| Avg. Glass Content (%) | ISO 1172 | 63.65 | 62.89 |
| Avg. Resin Content (%) | ISO 1172 | 36.35 | 37.11 |
| Avg. Void Content (%) | — | 0 | 1.71 |
| Avg. Panel Thickness (mm) | — | 0.796 | 0.816 |

Example 3

The ballistic performance of various composites was evaluated by producing and testing panels at different areal densities. As references, reference panels were made with standard S-2 Glass® (24 oz/yd$^2$) woven roving from AGY (Aiken, S.C.) and with Hybon 2006 (25 oz/yd$^2$) E-glass woven roving from PPG Industries, Inc. The control polymeric resin matrix material for the reference panels was MMFCS2 Epoxy from Applied Poleramic (Benicia, Calif.). The reference panels were screened against the 0.30 cal FSP at different areal densities. The six-point ballistic limit ($V_{50}$) was calculated according to MIL-STD-662F. In addition, damage analysis was performed on two representative reference panels to determine the extent of damage caused by the ballistic event. For this analysis, the six largest damage patterns observed in a panel under high intensity light were measured using image analysis software, and the mean damage zone was calculated.

For comparison with the reference panels comprising S-2 Glass® and E-glass, exemplary composites of the present invention were prepared as follows. Rovings of glass fibers useful in the present invention were formed using a marble melt fiber production technique. A fixed number of small G150 forming cakes were produced, and subsequently twisted and assembled into a 250 yield fiber glass roving. The roving comprised glass fibers treated with 1383 sizing composition and having a nominal diameter of about 9 μm. The rovings were then woven into a 25 oz/yd$^2$ plain weave fabric (5.0 ppi×5.3 ppi, where ppi=picks per inch) on a rapier loom. Panels comprising composites of the present invention were produced via resin infusion using the benchmark epoxy resin MMFCS2 Epoxy from Applied Poleramic (Benicia, Calif.) at 2 lb/ft$^2$ and 5 lb/ft$^2$ for ballistic screening against the 0.30 cal FSP and 0.50 cal FSP, respectively. Physical characteristics and ballistic performances of the panels are provided below in Table 3. Table 4 provides a comparison of the ballistic performances of panels comprising composites of the present invention with panels comprising composites comprising E-glass and S-2 Glass®. Tables 3 and 4 indicate that panels comprising composites of the present invention unexpectedly show a considerable increase in ballistic performance compared to panels comprising E-glass at comparable areal densities and are not out-performed by panels comprising costly S-2 Glass®. In addition, the damage observed on panels comprising composites of the present invention was equivalent to the damage extent calculated for panels comprising S-2 Glass®, though panels comprising E-glass exhibited lesser damage.

TABLE 3

Physical characteristics and ballistic performance of panels comprising composites of the present invention.

| Composites: | 1 | 2 | 3 | 4 | 5 | 6 | 7 | 8 |
|---|---|---|---|---|---|---|---|---|
| Fabric Areal Density (oz/yd$^2$) | 23 | 23 | 24 | 24 | 25 | 25 | 25 | 25 |
| # of layers | 8 | 8 | 8 | 8 | 20 | 20 | 20 | 20 |
| Total Fabric Areal Density (oz/yd$^2$) | 184 | 184 | 192 | 192 | 500 | 500 | 480 | 480 |
| Panel Areal Density (AD) (lb/ft$^2$) | 1.92 | 1.92 | 2.048 | 2.048 | 4.83 | 4.84 | 4.93 | 4.9 |

TABLE 3-continued

Physical characteristics and ballistic performance of panels comprising composites of the present invention.

| Composites: | 1 | 2 | 3 | 4 | 5 | 6 | 7 | 8 |
|---|---|---|---|---|---|---|---|---|
| Panel Weight (lb) | 3 | 2.9 | 3.2 | 3.2 | 19.31 | 19.34 | 19.5 | 19.4 |
| Panel Thickness (mm) | 5.23 | 5.41 | 5.97 | 5.92 | 12.80 | 13.13 | 13.46 | 13.28 |
| Glass Content (%) | 73.79 | 71.89 | 68.08 | 67.95 | 71.41 | 71.5 | 70.2 | 71.51 |
| Threat | 0.30 cal FSP | 0.30 cal FSP | 0.30 cal FSP | 0.30 cal FSP | 0.50 cal FSP | 0.50 cal FSP | 0.50 cal FSP | 0.50 cal FSP |
| $V_{50}$ (fps) | 1075 | 1067 | 1116 | 1137 | 1444 | 1430 | 1399 | 1363 |
| $V_{50}$/Panel AD | 560 | 556 | 545 | 555 | 299 | 296 | 284 | 278 |

TABLE 4

Comparison of the ballistic performance of panels comprising composites (1-8) of the present invention with panels (9-19) comprising S-2 Glass ® and E-glass.

| Panel | Glass | Panel A.D. (lb/ft²) | 0.30 cal V50 Value (fps) | 0.50 cal V50 Value (fps) |
|---|---|---|---|---|
| 9 | E-glass | 1.96 | 983 | — |
| 10 | E-glass | 1.96 | 973 | — |
| 11 | S-2 Glass ® | 1.98 | 1140 | — |
| 12 | S-2 Glass ® | 2.08 | 1176 | — |
| 13 | S-2 Glass ® | 1.99 | 1136 | — |
| 14 | S-2 Glass ® | 1.98 | 1134 | — |
| 1 | Present Invention | 1.92 | 1075 | — |
| 2 | Present Invention | 1.92 | 1067 | — |
| 3 | Present Invention | 2.048 | 1116 | — |
| 4 | Present Invention | 2.048 | 1137 | — |
| 15 | E-glass | 4.8 | — | 1185 |
| 16 | S-2 Glass ® | 4.77 | — | 1391 |
| 17 | S-2 Glass ® | 4.72 | — | 1419 |
| 18 | S-2 Glass ® | 4.72 | — | 1376 |
| 19 | S-2 Glass ® | 4.81 | — | 1378 |
| 5 | Present Invention | 4.83 | — | 1444 |
| 6 | Present Invention | 4.84 | — | 1430 |
| 7 | Present Invention | 4.93 | — | 1399 |
| 8 | Present Invention | 4.90 | — | 1363 |

Example 4

The ballistic performance of other composites were evaluated against National Institute of Justice (NIJ) Standard 0108.01. As references, reference panels were made with Hybon 2006 (24 oz/yd²) E-glass woven roving from PPG Industries, Inc. The control polymeric resin matrix material for the reference panels was MMFCS2 Epoxy from Applied Poleramic (Benicia, Calif.).

For comparison with the reference panels comprising E-glass, exemplary composites of the present invention were prepared as follows. Rovings of glass fibers useful in the present invention were formed using a direct melt fiber production furnace. A fixed number of small DE150 forming cakes were produced, and subsequently twisted and assembled into a 250 yield fiber glass roving. The roving comprised glass fibers treated with 1383 sizing composition and having a nominal diameter of about 6.5 μm. The rovings were then woven into a 24 oz/yd² plain weave fabric (5.0 ppi×5.3 ppi, where ppi=picks per inch) on a rapier loom. Panels comprising composites of the present invention were produced via resin infusion using the benchmark epoxy resin MMFCS2 Epoxy from Applied Poleramic (Benicia, Calif.).

The composites were tested against a 0.44 mag 240 SWCGC projectile. The results of the NIJ Standard 0108.01 testing are summarized in Table 5 below.

TABLE 5

Physical characteristics and ballistic performance of panels comprising composites of the present invention.

| Panel | Sizing | # of Layers | Resin | Areal Density (lb/ft₂) | $V_{50}$ |
|---|---|---|---|---|---|
| Present Invention | 1383 | 22 | MMFCS2 | 5.29 | 1857 |
| Present Invention | 1383 | 20 | MMFCS2 | 4.39 | 1580 |
| E-glass | 2006 | 22 | MMFCS2 | 5.46 | 1648 |
| E-glass | 2006 | 20 | MMFCS2 | 5.01 | 1529 |

Table 5 indicates that panels comprising composites of the present invention resulted in higher $V_{50}$ at equivalent areal density or equivalent $V_{50}$ at lower areal density than the panels formed from E-glass.

Example 5

The glasses in this Example were made by melting mixtures of reagent grade chemicals in powder form in 10% Rh/Pt crucibles at the temperatures between 1500° C. and 1550° C. (2732° F.-2822° F.) for four hours. Each batch was about 1200 grams. After the 4-hour melting period, the molten glass was poured onto a steel plate for quenching. To compensate volatility loss of $B_2O_3$ (typically about 5% of the total target $B_2O_3$ concentration in laboratory batch melting condition for the 1200 gram batch size), the boron retention factor in the batch calculation was set at 95%. Other volatile species, such as fluoride and alkali oxides, were not adjusted in the batches for their emission loss because of their low concentrations in the glasses. The compositions in the examples represent as-batched compositions. Since reagent chemicals were used in preparing the glasses with an adequate adjustment of $B_2O_3$, the as-batched compositions illustrated are considered to be close to the measured compositions.

Melt viscosity as a function of temperature and liquidus temperature were determined by using ASTM Test Method C965 "Standard Practice for Measuring Viscosity of Glass Above the Softening Point," and C829 "Standard Practices for Measurement of Liquidus Temperature of Glass by the Gradient Furnace Method," respectively.

A polished disk of each glass sample with 40 mm diameter and 1-1.5 mm thickness was used for electrical property and mechanical property measurements, which were made from annealed glasses. Dielectric constant ($D_k$) and dissipation factor ($D_f$) of each glass were determined from 1 MHz to 1 GHz by ASTM Test Method D150 "Standard Test Methods for A-C Loss Characteristics and Permittivity (Dielectric Constant) of Solid Electrical Insulating Materials." According to the procedure, all samples were preconditioned at 25° C. under 50% humidity for 40 hours. Selective tests were performed for glass density using ASTM Test Method C729 "Standard Test Method for Density of Glass by the Sink-Float Comparator," for which all samples were annealed.

For selected compositions, a microindentation method was used to determine Young's modulus (from the initial slope of the curve of indentation loading—indentation depth, in the indenter unloading cycle), and microhardness (from the maximum indentation load and the maximum indentation depth). For the tests, the same disk samples, which had been tested for $D_k$ and $D_f$, were used. Five indentation measurements were made to obtain average Young's modulus and microhardness data. The microindentation apparatus was calibrated using a commercial standard reference glass block with a product name BK7. The reference glass has Young's modulus 90.1 GPa with one standard deviation of 0.26 GPa and microhardness 4.1 GPa with one standard deviation of 0.02 GPa, all of which were based on five measurements.

All compositional values in the examples are expressed in weight percent. In the Tables below, "E" refers to Young's modulus; "H" refers to microhardness; $\sigma_f$ refers to filament strength; and "Std" refers to standard deviation.

Table 6 Compositions

Samples 1-8 provide glass compositions (Table 6) by weight percentage: $SiO_2$ 62.5-67.5%, $B_2O_3$ 8.4-9.4%, $Al_2O_3$ 10.3-16.0%, MgO 6.5-11.1%, CaO 1.5-5.2%, $Li_2O$ 1.0%, $Na_2O$ 0.0%, $K_2O$ 0.8%, $Fe_2O_3$ 0.2-0.8%, $F_2$ 0.0%, $TiO_2$ 0.0%, and sulfate (expressed as $SO_3$) 0.0%.

The glasses were found to have $D_k$ of 5.44-5.67 and Df of 0.0006-0.0031 at 1 MHz, and $D_k$ of 5.47-6.67 and $D_f$ of 0.0048-0.0077 at 1 GHz frequency. The electric properties of the compositions in Series III illustrate significantly lower (i.e., improved) $D_k$ and $D_f$ over standard E-glass with $D_k$ of 7.29 and $D_f$ of 0.003 at 1 MHz and $D_k$ of 7.14 and $D_f$ of 0.0168 at 1 GHz.

In terms of fiber forming properties, the compositions in Table 6 have forming temperatures ($T_F$) of 1300-1372° C. and forming windows ($T_F$-$T_L$) of 89-222° C. This can be compared to a standard E-glass which has $T_F$ typically in the range 1170-1215° C. To prevent glass devitrification in fiber forming, a forming window ($T_F$-$T_L$) greater than 55° C. is desirable. All of the compositions in Table 6 exhibit satisfactory forming windows. Although the compositions of Table 6 have higher forming temperatures than E-glass, they have significantly lower forming temperatures than D-glass (typically about 1410° C.).

TABLE 6

Some glass compositions useful in some embodiments of the present invention.

| SAMPLES: | 1 | 2 | 3 | 4 | 5 | 6 | 7 | 8 |
|---|---|---|---|---|---|---|---|---|
| $Al_2O_3$ | 11.02 | 9.45 | 11.64 | 12.71 | 15.95 | 10.38 | 10.37 | 11.21 |
| $B_2O_3$ | 8.55 | 8.64 | 8.58 | 8.56 | 8.46 | 8.71 | 9.87 | 9.28 |
| CaO | 5.10 | 5.15 | 3.27 | 2.48 | 1.50 | 2.95 | 2.01 | 1.54 |
| CoO | 0.00 | 0.00 | 0.00 | 0.00 | 0.00 | 0.00 | 0.00 | 0.62 |
| $Fe_2O_3$ | 0.39 | 0.40 | 0.39 | 0.39 | 0.39 | 0.53 | 0.80 | 0.27 |
| $K_2O$ | 0.77 | 0.78 | 0.77 | 0.77 | 0.76 | 0.79 | 0.79 | 0.78 |
| $Li_2O$ | 0.98 | 0.99 | 0.98 | 0.98 | 0.97 | 1.00 | 1.00 | 1.00 |
| MgO | 6.70 | 7.44 | 8.04 | 8.69 | 9.24 | 10.39 | 11.05 | 11.04 |
| $SiO_2$ | 66.48 | 67.16 | 66.32 | 65.42 | 62.72 | 65.26 | 64.12 | 64.26 |
| Properties | | | | | | | | |
| $D_k$, 1 MHz | 5.62 | 5.59 | 5.44 | 5.47 | 5.50 | 5.67 | 5.57 | 5.50 |
| $D_k$, 1 GHz | 5.65 | 5.62 | 5.46 | 5.47 | 5.53 | 5.67 | 5.56 | 5.50 |
| $D_f$, 1 MHz | 0.0010 | 0.0006 | 0.0016 | 0.0008 | 0.0020 | 0.0031 | 0.0012 | 0.0010 |
| $D_f$, 1 GHz | 0.0048 | 0.0059 | 0.0055 | 0.0051 | 0.0077 | 0.0051 | 0.0053 | 0.0049 |
| $T_L$ (° C.) | 1209 | 1228 | 1215 | 1180 | 1143 | 1219 | 1211 | 1213 |
| $T_F$ (° C.) | 1370 | 1353 | 1360 | 1372 | 1365 | 1319 | 1300 | 1316 |
| $T_F - T_L$ (° C.) | 161 | 125 | 145 | 192 | 222 | 100 | 89 | 103 |

Table 7 Compositions

Samples 9-15 provide glass compositions: $SiO_2$ 60.8-68.0%, $B_2O_3$ 8.6 and 11.0%, $Al_2O_3$ 8.7-12.2%, MgO 9.5-12.5%, CaO 1.0-3.0%, $Li_2O$ 0.5-1.5%, $Na_2O$ 0.5%, $K_2O$ 0.8%, $Fe_2O_3$ 0.4%, $F_2$ 0.3%, $TiO_2$ 0.2%, and sulfate (expressed as $SO_3$) 0.0%.

The glasses were found to have $D_k$ of 5.55-5.95 and $D_f$ of 0.0002-0.0013 at 1 MHz, and $D_k$ of 5.54-5.94 and $D_f$ of 0.0040-0.0058 at 1 GHz frequency. The electric properties of the compositions in Table 7 illustrate significantly lower (improved) $D_k$ and $D_f$ over standard E-glass with $D_k$ of 7.29 and $D_f$ of 0.003 at 1 MHz, and $D_k$ of 7.14 and $D_f$ of 0.0168 at 1 GHz.

In terms of mechanical properties, the compositions of Table 7 have Young's modulus of 86.5-91.5 GPa and microhardness of 4.0-4.2 GPa, both of which are equal or higher than standard E glass that has Young's modulus of 85.9 GPa and microhardness of 3.8 GPa. The Young's moduli of the compositions in the Table 7 are also significantly higher than D-glass which is about 55 GPa based on literature data.

In terms of fiber forming properties, the compositions of Table 7 have forming temperature ($T_F$) of 1224-1365° C., and forming windows ($T_F$-$T_L$) of 6-105° C. as compared to standard E-glass having $T_F$ in the range 1170-1215° C. Some, but not all, of the Table 7 compositions have a forming window ($T_F$-$T_L$) greater than 55° C., which is considered preferable in some circumstances to avoid glass devitrification in commercial fiber forming operations. The Table 7 compositions have lower forming temperatures than those of D-glass (1410° C.), although higher than E-glass.

TABLE 7

Some glass compositions useful in some embodiments of the present invention.

| SAMPLES: | 9 | 10 | 11 | 12 | 13 | 14 | 15 |
|---|---|---|---|---|---|---|---|
| $Al_2O_3$ | 12.02 | 11.88 | 10.41 | 12.08 | 12.18 | 8.76 | 12.04 |
| $B_2O_3$ | 10.98 | 10.86 | 9.90 | 8.71 | 8.79 | 8.79 | 8.68 |
| CaO | 1.07 | 2.90 | 2.02 | 2.95 | 1.09 | 1.09 | 2.94 |
| $F_2$ | 0.32 | 0.31 | 0.32 | 0.32 | 0.32 | 0.32 | 0.32 |
| $Fe_2O_3$ | 0.40 | 0.39 | 0.40 | 0.40 | 0.40 | 0.40 | 0.40 |
| $K_2O$ | 0.78 | 0.77 | 0.79 | 0.79 | 0.79 | 0.79 | 0.78 |
| $Li_2O$ | 0.50 | 0.49 | 1.00 | 0.50 | 1.51 | 1.51 | 1.49 |
| MgO | 12.35 | 9.56 | 11.10 | 12.41 | 12.51 | 9.81 | 9.69 |
| $Na_2O$ | 0.51 | 0.51 | 0.52 | 0.52 | 0.52 | 0.52 | 0.52 |
| $SiO_2$ | 60.87 | 62.13 | 63.35 | 61.14 | 61.68 | 67.80 | 62.95 |
| $TiO_2$ | 0.20 | 0.20 | 0.20 | 0.20 | 0.20 | 0.20 | 0.20 |
| Properties | | | | | | | |
| $D_k$, 1 MHz | 5.69 | 5.55 | 5.74 | 5.84 | 5.95 | 5.60 | 5.88 |
| $D_k$, 1 GHz | 5.65 | 5.54 | 5.71 | 5.83 | 5.94 | 5.55 | 5.86 |
| $D_f$, 1 MHz | 0.0007 | 0.0013 | 0.0007 | 0.0006 | 0.0002 | 0.0002 | 0.0011 |
| $D_f$, 1 GHz | 0.0042 | 0.0040 | 0.0058 | 0.0043 | 0.0048 | 0.0045 | 0.0053 |
| $T_L$ (° C.) | 1214 | 1209 | 1232 | 1246 | 1248 | 1263 | 1215 |
| $T_F$ (° C.) | 1288 | 1314 | 1287 | 1277 | 1254 | 1365 | 1285 |
| $T_F - T_L$ (° C.) | 74 | 105 | 55 | 31 | 6 | 102 | 70 |
| E (GPa) | 90.5 | 87.4 | 86.8 | 86.5 | 89.6 | 87.2 | 91.5 |
| H (GPa) | 4.12 | 4.02 | 4.02 | 4.03 | 4.14 | 4.07 | 4.19 |

TABLE 8

Some glass compositions useful in some embodiments of the present invention.

| SAMPLES: | 16 | 17 | 18 | 19 | 20 |
|---|---|---|---|---|---|
| $Al_2O_3$ | 10.37 | 11.58 | 8.41 | 11.58 | 12.05 |
| $B_2O_3$ | 8.71 | 10.93 | 10.66 | 8.98 | 8.69 |
| CaO | 2.01 | 2.63 | 3.02 | 1.78 | 2.12 |
| $F_2$ | 0.32 | 0.30 | 0.30 | 0.30 | 0.30 |
| $Fe_2O_3$ | 0.40 | 0.27 | 0.27 | 0.27 | 0.27 |
| $K_2O$ | 0.79 | 0.25 | 0.25 | 0.16 | 0.10 |
| $Li_2O$ | 0.50 | 1.21 | 1.53 | 0.59 | 1.40 |
| MgO | 11.06 | 10.04 | 9.65 | 11.65 | 10.57 |
| $Na_2O$ | 0.52 | 0.25 | 0.57 | 0.35 | 0.15 |
| $SiO_2$ | 65.13 | 62.55 | 65.35 | 64.35 | 64.35 |
| $TiO_2$ | 0.20 | 0.00 | 0.00 | 0.00 | 0.00 |
| Total | 100.00 | 100.00 | 100.00 | 100.00 | 100.00 |
| $D_k$, 1 MHz | 5.43 | 5.57 | | 5.30 | 5.42 |
| $D_k$, 1 GHz | 5.33 | 5.48 | | 5.22 | 5.33 |
| $D_f$, 1 MHz | 0.0057 | 0.0033 | | 0.0031 | 0.0051 |
| $D_f$, 1 GHz | 0.0003 | 0.0001 | | 0.0008 | 0.0014 |
| $T_L$ (° C.) | 1231 | 1161 | 1196 | 1254 | 1193 |
| $T_F$ (° C.) | 1327 | 1262 | 1254 | 1312 | 1299 |
| $T_F - T_L$ (° C.) | 96 | 101 | 58 | 58 | 106 |
| $T_M$ (° C.) | 1703 | 1592 | 1641 | 1634 | 1633 |
| E (GPa) | 85.3 | 86.1 | 85.7 | 91.8 | 89.5 |
| Std E (GPa) | 0.4 | 0.6 | 2.5 | 1.7 | 1.5 |
| H (GPa) | 3.99 | 4.00 | 4.03 | 4.22 | 4.13 |
| Std H (GPa) | 0.01 | 0.02 | 0.09 | 0.08 | 0.05 |

| SAMPLES: | 21 | 22 | 23 | 24 | 25 | 26 |
|---|---|---|---|---|---|---|
| $Al_2O_3$ | 12.04 | 12.04 | 12.04 | 12.04 | 12.04 | 12.54 |
| $B_2O_3$ | 8.65 | 8.69 | 10.73 | 10.73 | 11.07 | 8.73 |
| CaO | 2.06 | 2.98 | 2.98 | 2.98 | 2.98 | 2.88 |
| $F_2$ | 0.45 | 0.45 | 0.45 | 0.45 | 0.45 | 2.00 |
| $Fe_2O_3$ | 0.35 | 0.35 | 0.35 | 0.35 | 0.35 | 0.35 |
| $K_2O$ | 0.4 | 0.4 | 0.4 | 0.4 | 0.4 | 0.40 |
| $Li_2O$ | 1.53 | 1.05 | 1.05 | 0.59 | 0.48 | |
| MgO | 10.47 | 10.62 | 9.97 | 11.26 | 11.26 | 11.26 |
| $Na_2O$ | 0.5 | 0.5 | 0.5 | 0.5 | 0.5 | 0.50 |
| $SiO_2$ | 63.05 | 62.42 | 61.03 | 60.2 | 59.97 | 61.34 |
| $TiO_2$ | 0.5 | 0.5 | 0.5 | 0.5 | 0.5 | |
| Total | 100.00 | 100.00 | 100.00 | 100.00 | 100.00 | 100.00 |
| $D_k$, 1 MHz | 5.75 | 5.73 | 5.61 | 5.64 | 5.63 | 5.35 |
| $D_k$, 1 GHz | 5.68 | 5.61 | 5.55 | 5.54 | 5.49 | 5.38 |
| $D_f$, 1 MHz | 0.004 | 0.0058 | 0.0020 | 0.0046 | 0.0040 | 0.0063 |

TABLE 8-continued

Some glass compositions useful in some embodiments of the present invention.

| | | | | | | |
|---|---|---|---|---|---|---|
| $D_f$, 1 GHz | 0.0021 | 0.0024 | 0.0034 | 0.0019 | 0.0023 | 0.0001 |
| $T_L$ (° C.) | 1185 | 1191 | 1141 | 1171 | 1149 | 1227 |
| $T_F$ (° C.) | 1256 | 1258 | 1244 | 1246 | 1249 | 1301 |
| $T_F - T_L$ (° C.) | 71 | 67 | 103 | 75 | 100 | |
| $T_M$ (° C.) | 1587 | 1581 | 1587 | 1548 | 1553 | |
| E (GPa) | | | | | | |
| Std E (GPa) | | | | | | |
| H (GPa) | | | | | | |
| Std H (GPa) | | | | | | |
| $\sigma_f$(KPSI/GPa) | | | 475.7/3.28 | 520.9/3.59 | 466.5/3.22 | 522.0 |
| Std $\sigma_f$ (KPSI/GPa) | | | 37.3/0.26 | 18.3/0.13 | 41.8/0.29 | 18.70 |
| Density (g/cm³) | | | 2.4209* | 2.4324* | 2.4348* | |

TABLE 9

Some glass compositions useful in some embodiments of the present invention.

| SAMPLES: | 27 | 28 | E-Glass |
|---|---|---|---|
| $Al_2O_3$ | 12.42 | 12.57 | 13.98 |
| $B_2O_3$ | 9.59 | 8.59 | 5.91 |
| CaO | 0.11 | 0.10 | 22.95 |
| $F_2$ | 0.35 | 0.26 | 0.71 |
| $Fe_2O_3$ | 0.21 | 0.21 | 0.36 |
| $K_2O$ | 0.18 | 0.18 | 0.11 |
| $Li_2O$ | 0.80 | 1.01 | 0 |
| MgO | 10.25 | 10.41 | 0.74 |
| $Na_2O$ | 0.15 | 0.18 | 0.89 |
| $SiO_2$ | 65.47 | 65.96 | 54.15 |
| $TiO_2$ | 0.17 | 0.17 | 0.07 |
| $D_k$, 1 MHz | 5.3 | 5.4 | 7.3 |
| $D_k$, 1 GHz | 5.3 | 5.4 | 7.1 |
| $D_f$, 1 MHz | 0.003 | 0.008 | |
| $D_f$, 1 GHz | 0.011 | 0.012 | 0.0168 |
| $T_L$ (° C.) | 1184 | 1201 | 1079 |
| $T_F$ (° C.) | 1269 | 1282 | 1173 |
| $T_F - T_L$ (° C.) | 85 | 81 | 94 |
| E (GPa) | | | |
| H (GPa) | 3.195 | 3.694 | |

Samples 29-62 provide glass compositions (Table 10) by weight percentage: $SiO_2$ 53.74-76.97%, $B_2O_3$ 4.47-14.28%, $Al_2O_3$ 4.63-15.44%, MgO 4.20-12.16%, CaO 1.04-10.15%, $Li_2O$ 0.0-3.2%, $Na_2O$ 0.0-1.61%, $K_2O$ 0.01-0.05%, $Fe_2O_3$ 0.06-0.35%, $F_2$ 0.49-1.48%, $TiO_2$ 0.05-0.65%, and sulfate (expressed as $SO_3$) 0.0-0.16%.

Samples 29-62 provide glass compositions (Table 10) by weight percentage wherein the (MgO+CaO) content is 7.81-16.00%, the ratio CaO/MgO is 0.09-1.74%, the ($SiO_2$+$B_2O_3$) content is 67.68-81.44%, the ratio $Al_2O_3/B_2O_3$ is 0.90-1.71%, the ($Li_2O$+$Na_2O$+$K_2O$) content is 0.03-3.38%, and the ratio $Li_2O/(Li_2O+Na_2O+K_2O)$ is 0.00-0.95%.

In terms of mechanical properties, the compositions of Table 10 have a fiber density of 2.331-2.416 g/cm³ and an average fiber tensile strength (or fiber strength) of 3050-3578 MPa.

To measure fiber tensile strength, fiber samples from the glass compositions were produced from a 10 Rh/90 Pt single tip fiber drawing unit. Approximately, 85 grams of cullet of a given composition was fed into the bushing melting unit and conditioned at a temperature close or equal to the 100 Poise melt viscosity for two hours. The melt was subsequently lowered to a temperature close or equal to the 1000 Poise melt viscosity and stabilized for one hour prior to fiber drawing. Fiber diameter was controlled to produce an approximately 10 μm diameter fiber by controlling the speed of the fiber drawing winder. All fiber samples were captured in air without any contact with foreign objects. The fiber drawing was completed in a room with a controlled humidity of between 40 and 45% RH.

Fiber tensile strength was measured using a Kawabata KES-G1 (Kato Tech Co. Ltd., Japan) tensile strength analyzer equipped with a Kawabata type C load cell. Fiber samples were mounted on paper framing strips using a resin adhesive. A tensile force was applied to the fiber until failure, from which the fiber strength was determined based on the fiber diameter and breaking stress. The test was done at room temperature under the controlled humidity between 40-45% RH. The average values and standard deviations were computed based on a sample size of 65-72 fibers for each composition.

The glasses were found to have $D_k$ of 4.83-5.67 and $D_f$ of 0.003-0.007 at 1 GHz. The electric properties of the compositions in Table 10 illustrate significantly lower (i.e., improved) $D_k$ and $D_f$ over standard E-glass which has a $D_k$ of 7.14 and a $D_f$ of 0.0168 at 1 GHz.

In terms of fiber forming properties, the compositions in Table 10 have forming temperatures ($T_F$) of 1247-1439° C. and forming windows ($T_F$-$T_L$) of 53-243° C. The compositions in Table 10 have liquidus temperature ($T_L$) of 1058-1279° C. This can be compared to a standard E-glass which has $T_F$ typically in the range 1170-1215° C. To prevent glass devitrification in fiber forming, a forming window ($T_F$-$T_L$) greater than 55° C. is sometimes desirable. All of the compositions in Table 10 exhibit satisfactory forming windows.

TABLE 10

Some glass compositions useful in some embodiments of the present invention.

| wt % | 29 | 30 | 31 | 32 | 33 |
|---|---|---|---|---|---|
| $SiO_2$ | 64.24 | 58.62 | 57.83 | 61.00 | 61.56 |
| $Al_2O_3$ | 11.54 | 12.90 | 12.86 | 12.87 | 12.82 |
| $Fe_2O_3$ | 0.28 | 0.33 | 0.33 | 0.33 | 0.32 |
| CaO | 1.70 | 1.04 | 2.48 | 2.48 | 1.08 |
| MgO | 11.69 | 11.63 | 12.16 | 9.31 | 10.69 |
| $Na_2O$ | 0.01 | 0.00 | 0.00 | 0.00 | 0.00 |

TABLE 10-continued

Some glass compositions useful in some embodiments of the present invention.

| | | | | | |
|---|---|---|---|---|---|
| $K_2O$ | 0.03 | 0.03 | 0.03 | 0.03 | 0.03 |
| $B_2O_3$ | 8.96 | 14.28 | 13.15 | 12.81 | 12.30 |
| $F_2$ | 0.53 | 0.62 | 0.61 | 0.61 | 0.65 |
| $TiO_2$ | 0.40 | 0.54 | 0.54 | 0.54 | 0.54 |
| $Li_2O$ | 0.60 | 0.00 | 0.00 | 0.00 | 0.00 |
| $SO_3$ | 0.01 | 0.01 | 0.01 | 0.01 | 0.01 |
| Total | 100.00 | 100.00 | 100.00 | 100.00 | 100.00 |
| (MgO + CaO) | 13.39 | 12.67 | 14.64 | 11.79 | 11.77 |
| CaO/Mg | 0.15 | 0.09 | 0.20 | 0.27 | 0.10 |
| MgO/(MgO + CaO) | 0.87 | 0.92 | 0.83 | 0.79 | 0.91 |
| $SiO_2 + B_2O_3$ | 73.20 | 72.90 | 70.98 | 73.81 | 73.86 |
| $Al_2O_3/B_2O_3$ | 1.29 | 0.90 | 0.98 | 1.00 | 1.04 |
| $(Li_2O + Na_2O + K_2O)$ | 0.64 | 0.03 | 0.03 | 0.03 | 0.03 |
| $Li_2O/(Li_2O + Na_2O + K_2O)$ | 0.94 | 0.00 | 0.00 | 0.00 | 0.00 |
| $T_L$ (° C.) | 1196 | 1228 | 1205 | 1180 | 1249 |
| $T_F$ (° C.) | 1331 | 1300 | 1258 | 1334 | 1332 |
| $T_F - T_L$ (° C.) | 135 | 72 | 53 | 154 | 83 |
| $D_k$ @ 1 GHz | 5.26 | *** | *** | 5.30 | *** |
| $D_f$ @ 1 GHz | 0.0017 | *** | *** | 0.001 | *** |
| Fiber density (g/cm$^3$) | *** | *** | *** | *** | *** |
| Fiber strength (MPa) | *** | *** | *** | *** | *** |

| wt % | 34 | 35 | 36 | 37 | 38 |
|---|---|---|---|---|---|
| $SiO_2$ | 63.83 | 65.21 | 66.70 | 60.02 | 53.74 |
| $Al_2O_3$ | 10.97 | 10.56 | 10.11 | 12.32 | 15.44 |
| $Fe_2O_3$ | 0.26 | 0.25 | 0.24 | 0.29 | 0.24 |
| CaO | 2.38 | 2.29 | 2.19 | 4.01 | 3.83 |
| MgO | 10.64 | 10.23 | 9.79 | 9.95 | 10.53 |
| $Na_2O$ | 0.29 | 0.28 | 0.27 | 0.33 | 0.09 |
| $K_2O$ | 0.03 | 0.03 | 0.03 | 0.03 | 0.03 |
| $B_2O_3$ | 9.32 | 8.96 | 8.57 | 10.48 | 13.94 |
| $F_2$ | 1.20 | 1.16 | 1.11 | 1.35 | 1.48 |
| $TiO_2$ | 0.36 | 0.35 | 0.33 | 0.41 | 0.65 |
| $Li_2O$ | 0.70 | 0.67 | 0.64 | 0.79 | 0.02 |
| $SO_3$ | 0.14 | 0.14 | 0.13 | 0.16 | 0.14 |
| Total | 100.13 | 100.13 | 100.12 | 100.15 | 100.13 |
| (MgO + CaO) | 13.02 | 12.52 | 11.98 | 13.96 | 14.36 |
| CaO/MgO | 0.22 | 0.22 | 0.22 | 0.40 | 0.36 |
| MgO/(MgO + CaO) | 0.82 | 0.82 | 0.82 | 0.71 | 0.73 |
| $SiO_2 + B_2O_3$ | 73.15 | 74.17 | 75.27 | 70.50 | 67.68 |
| $Al_2O_3/B_2O_3$ | 1.18 | 1.18 | 1.18 | 1.18 | 1.11 |
| $(Li_2O + Na_2O + K_2O)$ | 1.02 | 0.98 | 0.94 | 1.15 | 0.14 |
| $Li_2O/(Li_2O + Na_2O + K_2O)$ | 0.69 | 0.68 | 0.68 | 0.69 | 0.16 |
| $T_L$ (° C.) | 1255 | 1267 | 1279 | 1058 | 1175 |
| $T_F$ (° C.) | 1313 | 1320 | 1333 | 1266 | 1247 |
| $T_F - T_L$ (° C.) | 58 | 53 | 54 | 208 | 72 |
| $D_k$ @ 1 GHz | *** | 5.46 | 5.43 | 5.56 | 5.57 |
| $D_f$ @ 1 GHz | *** | 0.0036 | 0.0020 | 0.0025 | 0.00437 |
| Fiber density (g/cm$^3$) | 2.402 | 2.408 | 2.352 | 2.416 | *** |
| Fiber strength (MPa) | 3310 | 3354 | 3369 | 3413 | *** |

| wt % | 39 | 40 | 41 | 42 | 43 |
|---|---|---|---|---|---|
| $SiO_2$ | 62.54 | 63.83 | 65.21 | 66.70 | 59.60 |
| $Al_2O_3$ | 11.36 | 10.97 | 10.56 | 10.11 | 13.52 |
| $Fe_2O_3$ | 0.27 | 0.26 | 0.25 | 0.24 | 0.33 |
| CaO | 2.47 | 2.38 | 2.29 | 2.19 | 1.80 |
| MgO | 11.02 | 10.64 | 10.23 | 9.79 | 9.77 |
| $Na_2O$ | 0.31 | 0.29 | 0.28 | 0.27 | 0.10 |
| $K_2O$ | 0.03 | 0.03 | 0.03 | 0.03 | 0.03 |
| $B_2O_3$ | 9.65 | 9.32 | 8.96 | 8.57 | 12.70 |
| $F_2$ | 1.25 | 1.20 | 1.16 | 1.11 | 1.21 |
| $TiO_2$ | 0.37 | 0.36 | 0.35 | 0.33 | 0.51 |
| $Li_2O$ | 0.73 | 0.70 | 0.67 | 0.64 | 0.41 |
| $SO_3$ | 0.15 | 0.14 | 0.14 | 0.13 | 0.15 |
| Total | 100.14 | 100.13 | 100.13 | 100.12 | 100.14 |
| (MgO + CaO) | 13.49 | 13.02 | 12.52 | 11.98 | 11.57 |
| CaO/MgO | 0.22 | 0.22 | 0.22 | 0.22 | 0.18 |
| MgO/(MgO + CaO) | 0.82 | 0.82 | 0.82 | 0.82 | 0.84 |
| $SiO_2 + B_2O_3$ | 72.19 | 73.15 | 74.17 | 75.27 | 72.30 |
| $Al_2O_3/B_2O_3$ | 1.18 | 1.18 | 1.18 | 1.18 | 1.06 |
| $(Li_2O + Na_2O + K_2O)$ | 1.07 | 1.02 | 0.98 | 0.94 | 0.54 |
| $Li_2O/(Li_2O + Na_2O + K_2O)$ | 0.68 | 0.69 | 0.68 | 0.68 | 0.76 |
| $T_L$ (° C.) | 1238 | 1249 | 1266 | 1276 | 1083 |

TABLE 10-continued

Some glass compositions useful in some embodiments of the present invention.

| | | | | | |
|---|---|---|---|---|---|
| $T_F$ (° C.) | 1293 | 1313 | 1342 | 1368 | 1310 |
| $T_F - T_L$ (° C.) | 55 | 64 | 76 | 92 | 227 |
| $D_k$ @ 1 GHz | 5.45 | 5.31 | 5.39 | 5.25 | 5.20 |
| $D_f$ @ 1 GHz | 0.00531 | 0.00579 | 0.00525 | 0.00491 | 0.00302 |
| Fiber density (g/cm³) | 2.403 | *** | *** | *** | *** |
| Fiber strength (MPa) | 3467 | *** | *** | *** | *** |

| wt % | 44 | 45 | 46 | 47 | 48 |
|---|---|---|---|---|---|
| $SiO_2$ | 59.90 | 60.45 | 62.68 | 65.30 | 65.06 |
| $Al_2O_3$ | 13.23 | 13.06 | 12.28 | 11.51 | 12.58 |
| $Fe_2O_3$ | 0.34 | 0.35 | 0.20 | 0.19 | 0.25 |
| CaO | 1.86 | 1.58 | 1.65 | 1.39 | 1.25 |
| MgO | 10.14 | 10.50 | 8.74 | 8.18 | 6.56 |
| $Na_2O$ | 0.10 | 0.10 | 0.10 | 0.09 | 0.13 |
| $K_2O$ | 0.03 | 0.03 | 0.02 | 0.02 | 0.05 |
| $B_2O_3$ | 12.40 | 12.29 | 12.69 | 11.89 | 10.03 |
| $F_2$ | 1.26 | 1.07 | 1.11 | 0.94 | 0.82 |
| $TiO_2$ | 0.53 | 0.55 | 0.51 | 0.48 | 0.07 |
| $Li_2O$ | 0.20 | 0.00 | 0.00 | 0.00 | 3.20 |
| $SO_3$ | 0.15 | 0.16 | 0.15 | 0.14 | 0.11 |
| Total | 100.14 | 100.15 | 100.14 | 100.13 | 100.10 |
| RO (MgO + CaO) | 12.00 | 12.08 | 10.39 | 9.57 | 7.81 |
| CaO/Mg | 0.18 | 0.15 | 0.19 | 0.17 | 0.19 |
| MgO/(MgO + CaO) | 0.85 | 0.87 | 0.84 | 0.85 | 0.84 |
| $SiO_2 + B_2O_3$ | 72.30 | 72.74 | 75.37 | 77.19 | 75.09 |
| $Al_2O_3/B_2O_3$ | 1.07 | 1.06 | 0.97 | 0.97 | 1.25 |
| $(Li_2O + Na_2O + K_2O)$ | 0.33 | 0.13 | 0.12 | 0.11 | 3.38 |
| $Li_2O/(Li_2O + Na_2O + K_2O)$ | 0.61 | 0.00 | 0.00 | 0.00 | 0.95 |
| $T_L$ (° C.) | 1129 | 1211 | 1201 | 1196 | *** |
| $T_F$ (° C.) | 1303 | 1378 | 1378 | 1439 | *** |
| $T_F - T_L$ (° C.) | 174 | 167 | 177 | 243 | *** |
| Dk @ 1 GHz | 5.24 | 5.05 | 4.94 | 4.83 | 5.67 |
| Df @ 1 GHz | 0.00473 | 0.00449 | 0.00508 | 0.00254 | 0.007 |
| Fiber density (g/cm³) | 2.387 | 2.385 | 2.354 | 2.34 | 2.345 |
| Fiber strength (MPa) | 3483 | 3362 | 3166 | 3050 | 3578 |

| wt % | 49 | 50 | 51 | 52 | 53 |
|---|---|---|---|---|---|
| $SiO_2$ | 61.14 | 60.83 | 62.45 | 61.88 | 66.25 |
| $Al_2O_3$ | 12.90 | 13.02 | 12.52 | 12.72 | 10.60 |
| $Fe_2O_3$ | 0.27 | 0.28 | 0.26 | 0.28 | 0.18 |
| CaO | 1.72 | 1.74 | 1.59 | 1.63 | 3.33 |
| MgO | 9.25 | 9.36 | 8.98 | 9.13 | 5.98 |
| $Na_2O$ | 0.10 | 0.10 | 0.10 | 0.10 | 0.86 |
| $K_2O$ | 0.03 | 0.03 | 0.03 | 0.03 | 0.02 |
| $B_2O_3$ | 12.70 | 12.70 | 12.29 | 12.38 | 11.44 |
| $F_2$ | 1.16 | 1.17 | 1.08 | 1.10 | 0.90 |
| $TiO_2$ | 0.51 | 0.51 | 0.50 | 0.50 | 0.44 |
| $Li_2O$ | 0.21 | 0.25 | 0.21 | 0.25 | 0.00 |
| $SO_3$ | 0.15 | 0.15 | 0.14 | 0.14 | 0.00 |
| Total | 100.14 | 100.14 | 100.13 | 100.13 | 100.00 |
| (MgO + CaO) | 10.97 | 11.10 | 10.57 | 10.76 | 9.31 |
| CaO/Mg | 0.19 | 0.19 | 0.18 | 0.18 | 0.56 |
| MgO/(MgO + CaO) | 0.84 | 0.84 | 0.85 | 0.85 | 0.64 |
| $SiO_2 + B_2O_3$ | 73.84 | 73.53 | 74.74 | 74.26 | 77.69 |
| $Al_2O_3/B_2O_3$ | 1.02 | 1.03 | 1.02 | 1.03 | 0.93 |
| $(Li_2O + Na_2O + K_2O)$ | 0.34 | 0.38 | 0.34 | 0.38 | 0.88 |
| $Li_2O/(Li_2O + Na_2O + K_2O)$ | 0.62 | 0.66 | 0.62 | 0.66 | 0.00 |
| $T_L$ (° C.) | 1179 | 1179 | 1186 | 1191 | *** |
| $T_F$ (° C.) | 1342 | 1340 | 1374 | 1366 | *** |
| $T_F - T_L$ (° C.) | 163 | 161 | 188 | 175 | *** |
| $D_k$ @ 1 GHz | *** | 5.24 | 4.96 | 5.06 | 5.03 |
| $D_f$ @ 1 GHz | *** | 0.0018 | 0.0015 | 0.0014 | 0.0027 |
| Fiber density (g/cm³) | 2.358 | 2.362 | 2.338 | *** | 2.331 |
| Fiber strength (MPa) | 3545 | 3530 | 3234 | *** | 3161 |

| wt % | 54 | 55 | 56 | 57 | 58 |
|---|---|---|---|---|---|
| $SiO_2$ | 66.11 | 69.19 | 70.68 | 69.44 | 69.40 |
| $Al_2O_3$ | 10.58 | 10.37 | 8.87 | 7.20 | 7.21 |
| $Fe_2O_3$ | 0.18 | 0.18 | 0.16 | 0.13 | 0.14 |
| CaO | 5.31 | 5.20 | 5.50 | 5.57 | 10.15 |
| MgO | 4.20 | 7.13 | 7.54 | 10.39 | 5.85 |
| $Na_2O$ | 0.86 | 0.55 | 0.59 | 0.59 | 0.59 |
| $K_2O$ | 0.02 | 0.02 | 0.02 | 0.02 | 0.02 |

TABLE 10-continued

Some glass compositions useful in some embodiments of the present invention.

| | | | | | |
|---|---|---|---|---|---|
| $B_2O_3$ | 11.41 | 6.39 | 5.72 | 5.80 | 5.79 |
| $F_2$ | 0.90 | 0.53 | 0.55 | 0.55 | 0.55 |
| $TiO_2$ | 0.44 | 0.43 | 0.37 | 0.30 | 0.30 |
| $Li_2O$ | 0.00 | 0.00 | 0.00 | 0.00 | 0.00 |
| $SO_3$ | 0.00 | 0.00 | 0.00 | 0.00 | 0.00 |
| Total | 100.00 | 100.00 | 100.00 | 100.00 | 100.00 |
| (MgO + CaO) | 9.51 | 12.33 | 13.04 | 15.96 | 16.00 |
| CaO/Mg | 1.26 | 0.73 | 0.73 | 0.54 | 1.74 |
| MgO/(MgO + CaO) | 0.44 | 0.58 | 0.58 | 0.65 | 0.37 |
| $SiO_2 + B_2O_3$ | 77.52 | 75.58 | 76.40 | 75.24 | 75.19 |
| $Al_2O_3/B_2O_3$ | 0.93 | 1.62 | 1.55 | 1.24 | 1.25 |
| $(Li_2O + Na_2O + K_2O)$ | 0.88 | 0.57 | 0.61 | 0.61 | 0.61 |
| $Li_2O/(Li_2O + Na_2O + K_2O)$ | 0.00 | 0.00 | 0.00 | 0.00 | 0.00 |
| $T_L$ (° C.) | *** | *** | *** | *** | *** |
| $T_F$ (° C.) | *** | *** | *** | *** | *** |
| $T_F - T_L$ (° C.) | *** | *** | *** | *** | *** |
| $D_k$ @ 1 GHz | *** | *** | *** | *** | *** |
| $D_f$ @ 1 GHz | *** | *** | *** | *** | *** |
| Fiber density (g/cm$^3$) | 2.341 | *** | *** | *** | *** |
| Fiber strength (MPa) | 3372 | *** | *** | *** | *** |

| wt % | 59 | 60 | 61 | 62 |
|---|---|---|---|---|
| $SiO_2$ | 69.26 | 71.45 | 74.07 | 76.97 |
| $Al_2O_3$ | 8.72 | 5.30 | 7.27 | 4.63 |
| $Fe_2O_3$ | 0.13 | 0.06 | 0.09 | 0.10 |
| CaO | 4.89 | 5.24 | 4.88 | 5.69 |
| MgO | 9.92 | 10.63 | 4.77 | 5.56 |
| $Na_2O$ | 0.53 | 0.58 | 0.73 | 1.61 |
| $K_2O$ | 0.03 | 0.02 | 0.03 | 0.01 |
| $B_2O_3$ | 5.09 | 4.96 | 6.39 | 4.47 |
| $F_2$ | 0.49 | 0.50 | 0.66 | 0.77 |
| $TiO_2$ | 0.27 | 0.05 | 0.17 | 0.19 |
| $Li_2O$ | 0.69 | 1.20 | 0.95 | 0.00 |
| $SO_3$ | 0.00 | 0.00 | 0.00 | 0.00 |
| Total | 100.00 | 100.00 | 100.00 | 100.00 |
| (MgO + CaO) | 14.81 | 15.87 | 9.65 | 11.25 |
| CaO/Mg | 0.49 | 0.49 | 1.02 | 1.02 |
| MgO/(MgO + CaO) | 0.67 | 0.67 | 0.49 | 0.49 |
| $SiO_2 + B_2O_3$ | 74.35 | 76.41 | 80.46 | 81.44 |
| $Al_2O_3/B_2O_3$ | 1.71 | 1.07 | 1.14 | 1.04 |
| $(Li_2O + Na_2O + K_2O)$ | 1.25 | 1.80 | 1.71 | 1.62 |
| $Li_2O/(Li_2O + Na_2O + K_2O)$ | 0.55 | 0.67 | 0.56 | 0.00 |
| $T_L$ (° C.) | *** | *** | *** | *** |
| $T_F$ (° C.) | 1358/1355 | 1331/1333 | 1493/1484 | *** |
| $T_F - T_L$ (° C.) | *** | *** | *** | *** |
| $D_k$ @ 1 GHz | *** | *** | *** | *** |
| $D_f$ @ 1 GHz | *** | *** | *** | *** |
| Fiber density (g/cm$^3$) | *** | *** | *** | *** |
| Fiber strength (MPa) | *** | *** | *** | *** |

Samples 63-73 provide glass compositions (Table 11) by weight percentage: $SiO_2$ 62.35-68.35%, $B_2O_3$ 6.72-8.67%, $Al_2O_3$ 10.53-18.04%, MgO 8.14-11.44%, CaO 1.67-2.12%, $Li_2O$ 1.07-1.38%, $Na_2O$ 0.02%, $K_2O$ 0.03-0.04%, $Fe_2O_3$ 0.23-0.33%, $F_2$ 0.49-0.60%, $TiO_2$ 0.26-0.61%, and sulfate (expressed as $SO_3$) 0.0%.

Samples 63-73 provide glass compositions (Table 11) by weight percentage wherein the (MgO+CaO) content is 9.81-13.34%, the ratio CaO/MgO is 0.16-0.20, the ($SiO_2+B_2O_3$) content is 69.59-76.02%, the ratio $Al_2O_3/B_2O_3$ is 1.37-2.69, the ($Li_2O+Na_2O+K_2O$) content is 1.09-1.40%, and the ratio $Li_2O/(Li_2O+Na_2O+K_2O)$ is 0.98.

In terms of mechanical properties, the compositions of Table 11 have a fiber density of 2.371-2.407 g/cm$^3$ and an average fiber tensile strength (or fiber strength) of 3730-4076 MPa. The fiber tensile strengths for the fibers made from the compositions of Table 11 were measured in the same way as the fiber tensile strengths measured in connection with the compositions of Table 10.

The fibers formed from the compositions were found to have Young's modulus (E) values ranging from 73.84-81.80 GPa. The Young's modulus (E) values for the fibers were measured using the sonic modulus method on fibers. Elastic modulus values for the fibers drawn from glass melts having the recited compositions were determined using an ultrasonic acoustic pulse technique on a Panatherm 5010 instrument from Panametrics, Inc. of Waltham, Mass. Extensional wave reflection time was obtained using twenty micro-second duration, 200 kHz pulses. The sample length was measured and the respective extensional wave velocity ($V_E$) was calculated. Fiber density ($\rho$) was measured using a Micromeritics AccuPyc 1330 pycnometer. In general, 20 measurements were made for each composition and the average Young's modulus (E) was calculated according to the formula $E=V_E^2*\rho$. The fiber failure strain was calculated using Hooke's Law based on the known fiber strength and Young's modulus values.

The glasses were found to have $D_k$ of 5.20-5.54 and Df of 0.0010-0.0020 at 1 GHz. The electric properties of the compositions in Table 11 illustrate significantly lower (i.e., improved) $D_k$ and $D_f$ over standard E-glass with $D_k$ of 7.14 and $D_f$ of 0.0168 at 1 GHz.

In terms of fiber forming properties, the compositions in Table 11 have forming temperatures ($T_F$) of 1303-1388° C. and forming windows ($T_F$-$T_L$) of 51-144° C.

TABLE 11

Some glass compositions useful in some embodiments of the present invention.

| wt % | 63 | 64 | 65 | 66 | 67 |
|---|---|---|---|---|---|
| $SiO_2$ | 64.25 | 65.35 | 66.38 | 67.35 | 68.35 |
| $Al_2O_3$ | 11.88 | 11.52 | 11.18 | 10.86 | 10.53 |
| $Fe_2O_3$ | 0.26 | 0.25 | 0.24 | 0.24 | 0.23 |
| CaO | 2.12 | 2.05 | 1.99 | 1.93 | 1.87 |
| MgO | 10.50 | 10.17 | 9.87 | 9.58 | 9.29 |
| $Na_2O$ | 0.02 | 0.02 | 0.02 | 0.02 | 0.02 |
| $K_2O$ | 0.04 | 0.03 | 0.03 | 0.03 | 0.03 |
| $B_2O_3$ | 8.67 | 8.40 | 8.15 | 7.91 | 7.67 |
| $F_2$ | 0.60 | 0.58 | 0.56 | 0.54 | 0.53 |
| $TiO_2$ | 0.30 | 0.29 | 0.28 | 0.27 | 0.26 |
| $Li_2O$ | 1.38 | 1.33 | 1.29 | 1.26 | 1.22 |
| $SO_3$ | 0.00 | 0.00 | 0.00 | 0.00 | 0.00 |
| Total | 100.00 | 100.00 | 100.00 | 100.00 | 100.00 |
| (MgO + CaO) | 12.61 | 12.22 | 11.86 | 11.51 | 11.16 |
| CaO/MgO | 0.20 | 0.20 | 0.20 | 0.20 | 0.20 |
| MgO/(MgO + CaO) | 0.83 | 0.83 | 0.83 | 0.83 | 0.83 |
| $SiO_2 + B_2O_3$ | 72.92 | 73.75 | 74.53 | 75.26 | 76.02 |
| $Al_2O_3/B_2O_3$ | 1.37 | 1.37 | 1.37 | 1.37 | 1.37 |
| ($Li_2O + Na_2O + K_2O$) | 1.40 | 1.36 | 1.32 | 1.28 | 1.24 |
| $Li_2O$/($Li_2O + Na_2O + K_2O$) | 0.98 | 0.98 | 0.98 | 0.98 | 0.98 |
| $T_L$ (° C.) | 1241 | 1259 | 1266 | 1268 | 1287 |
| $T_F$ (° C.) | 1306 | 1329 | 1349 | 1374 | 1388 |
| $T_F - T_L$ (° C.) | 65 | 70 | 83 | 106 | 101 |
| $D_k$ @ 1 GHz | 5.44 | 5.35 | 5.29 | 5.31 | 5.2 |
| $D_f$ @ 1 GHz | 0.0013 | 0.0016 | 0.001 | 0.002 | 0.0013 |
| Fiber density (g/cm³) | 2.395 | 2.385 | 2.384 | 2.375 | 2.371 |
| Fiber strength (MPa) | 3730 | 3759 | 3813 | 3743 | 3738 |
| Young's Modulus (GPa) | *** | *** | *** | 74.25 | *** |
| Fiber failure strain (%) | *** | *** | *** | 5.04 | *** |

| wt % | 68 | 69 | 70 | 71 | 72 | 73 |
|---|---|---|---|---|---|---|
| $SiO_2$ | 64.39 | 63.63 | 62.87 | 65.45 | 65.61 | 62.35 |
| $Al_2O_3$ | 14.05 | 16.04 | 18.04 | 11.05 | 14.29 | 14.74 |
| $Fe_2O_3$ | 0.28 | 0.30 | 0.33 | 0.24 | 0.28 | 0.29 |
| CaO | 1.90 | 1.79 | 1.67 | 1.91 | 1.77 | 1.79 |
| MgO | 9.39 | 8.77 | 8.14 | 11.44 | 8.72 | 11.37 |
| $Na_2O$ | 0.02 | 0.02 | 0.02 | 0.02 | 0.02 | 0.02 |
| $K_2O$ | 0.04 | 0.04 | 0.04 | 0.03 | 0.04 | 0.04 |
| $B_2O_3$ | 7.75 | 7.23 | 6.72 | 7.80 | 7.19 | 7.28 |
| $F_2$ | 0.54 | 0.51 | 0.49 | 0.54 | 0.51 | 0.51 |
| $TiO_2$ | 0.41 | 0.51 | 0.61 | 0.28 | 0.43 | 0.45 |
| $Li_2O$ | 1.23 | 1.15 | 1.07 | 1.24 | 1.14 | 1.16 |
| $SO_3$ | 0.00 | 0.00 | 0.00 | 0.00 | 0.00 | 0.00 |
| Total | 100.00 | 100.00 | 100.00 | 100.00 | 100.00 | 100.00 |
| (MgO + CaO) | 11.29 | 10.55 | 9.81 | 13.34 | 10.49 | 13.16 |
| CaO/MgO | 0.20 | 0.20 | 0.20 | 0.17 | 0.20 | 0.16 |
| MgO/(MgO + CaO) | 0.83 | 0.83 | 0.83 | 0.86 | 0.83 | 0.86 |
| $SiO_2 + B_2O_3$ | 72.14 | 70.87 | 69.59 | 73.25 | 72.80 | 69.63 |
| $Al_2O_3/B_2O_3$ | 1.81 | 2.22 | 2.69 | 1.42 | 1.99 | 2.02 |
| ($Li_2O + Na_2O + K_2O$) | 1.25 | 1.17 | 1.09 | 1.26 | 1.16 | 1.18 |
| $Li_2O$/($Li_2O + Na_2O + K_2O$) | 0.98 | 0.98 | 0.98 | 0.98 | 0.98 | 0.98 |
| $T_L$ (° C.) | 1231 | 1219 | 1236 | 1266 | 1235 | 1220 |
| $T_F$ (° C.) | 1349 | 1362 | 1368 | 1317 | 1379 | 1303 |
| $T_F - T_L$ (° C.) | 118 | 143 | 132 | 51 | 144 | 83 |
| $D_k$ @ 1 GHz | 5.4 | 5.38 | 5.39 | 5.54 | 5.52 | 5.58 |
| $D_f$ @ 1 GHz | 0.0016 | 0.0013 | 0.002 | 0.0015 | 0.0016 | 0.0015 |
| Fiber density (g/cm³) | 2.393 | 2.398 | 2.407 | *** | *** | *** |
| Fiber strength (MPa) | 3954 | 3977 | 4076 | *** | *** | *** |
| Young's Modulus (GPa) | 73.84 | 80.34 | 81.57 | 80.69 | 81.80 | *** |
| Fiber failure strain (%) | 5.36 | 4.95 | 5.00 | 4.68 | 4.72 | *** |

Desirable characteristics that can be exhibited by various but not necessarily all embodiments of the present invention can include, but are not limited to, the following: the provision of glass fibers having a relatively low density; the provision of glass fibers having a relatively high strength; the provision of glass fibers having a relatively high strain-to-failure; the provision of composites having relatively low areal density for a given fiber volume fraction or a given composite performance; the provision of glass fibers and composites useful for ballistic applications; and the provision of glass fibers and composites having relatively low cost compared to glass fibers and composites of similar ballistic performance.

Various embodiments of the invention have been described in fulfillment of the various objectives of the invention. It should be recognized that these embodiments are merely illustrative of the principles of the present invention. Numerous modifications and adaptations thereof will be readily apparent to those of skill in the art without departing from the spirit and scope of the invention.

That which is claimed:

1. A composite comprising:
a polymeric resin; and
a plurality of glass fibers disposed in the polymeric resin, wherein at least one of the plurality of glass fibers comprises a glass composition comprising

| | |
|---|---|
| $SiO_2$ | 60-68 weight percent; |
| $B_2O_3$ | 7-12 weight percent; |
| $Al_2O_3$ | 9-15 weight percent; |
| MgO | 8-15 weight percent; |
| CaO | 0-4 weight percent; |
| $Li_2O$ | 0-2 weight percent; |
| $Na_2O$ | 0-1 weight percent; |
| $K_2O$ | 0-1 weight percent; |
| $Fe_2O_3$ | 0-1 weight percent; |
| $F_2$ | 0-1 weight percent; |
| $TiO_2$ | 0-2 weight percent; and |
| other constituents | 0-5 weight percent total; | wherein the ($Li_2O+Na_2O+K_2O$) content is less than 2 weight percent, wherein the MgO content is at least twice the content of CaO on a weight percent basis, and wherein the composite is adapted for use in ballistics or blast resistance applications.

2. The composite of claim 1, wherein the composite exhibits a 0.30 cal FSP $V_{50}$ value of at least about 900 fps at an areal density of about 2 lb/ft$^2$ and a thickness of about 5-6 mm when measured by the U.S. Department of Defense Test Method Standard for $V_{50}$ Ballistic Test for Armor, MIL-STD-662F, December 1997.

3. The composite of claim 1, wherein the composite exhibits a 0.50 cal FSP $V_{50}$ value of at least about 1200 fps at an areal density of about 4.8-4.9 lb/ft$^2$ and a thickness of about 13-13.5 mm when measured by the U.S. Department of Defense Test Method Standard for $V_{50}$ Ballistic Test for Armor, MIL-STD-662F, December 1997.

4. The composite of claim 1, wherein the polymeric resin comprises an epoxy resin.

5. The composite of claim 1, wherein the polymeric resin comprises at least one of polyethylene, polypropylene, polyamide, polybutylene terephthalate, polycarbonate, thermoplastic polyurethane, phenolic, polyester, vinyl ester, and thermoset polyurethane resins.

6. The composite of claim 1, wherein the at least one of the plurality of glass fibers is at least partially coated with a sizing composition.

7. The composite of claim 1, wherein the plurality of glass fibers are arranged to form a fabric.

8. The composite of claim 7, wherein the plurality of glass fibers are woven to form the fabric.

9. The composite of claim 7, wherein the fabric comprises a plain weave fabric, a twill fabric, a crowfoot fabric, a satin weave fabric, a stitch bonded fabric, or a 3D woven fabric.

10. An armor panel comprising the composite of claim 7.

11. A composite comprising:
a polymeric resin; and
a plurality of glass fibers disposed in the polymeric resin, wherein at least one of the plurality of glass fibers comprises a glass composition comprising

| | |
|---|---|
| $SiO_2$ | 53.5-77 weight percent; |
| $B_2O_3$ | 4.5-14.5 weight percent; |
| $Al_2O_3$ | 4.5-18.5 weight percent; |
| MgO | 4-12.5 weight percent; |
| CaO | 0-10.5 weight percent; |
| $Li_2O$ | 0-2 weight percent; |
| $Na_2O$ | 0-2 weight percent; |
| $K_2O$ | 0-1 weight percent; |
| $Fe_2O_3$ | 0-1 weight percent; |
| $F_2$ | 0-2 weight percent; |
| $TiO_2$ | 0-2 weight percent; and |
| other constituents | 0-5 weight percent total; | wherein the composite is adapted for use in ballistics or blast resistance applications, wherein the (Li2O+Na2O+K2O) content is less than 2 weight percent, and wherein the MgO content is at least twice the content of CaO on a weight percent basis.

12. The composite of claim 11, wherein the composite exhibits a 0.30 cal FSP $V_{50}$ value of at least about 900 fps at an areal density of about 2 lb/ft$^2$ and a thickness of about 5-6 mm when measured by the U.S. Department of Defense Test Method Standard for $V_{50}$ Ballistic Test for Armor, MIL-STD-662F, December 1997.

13. The composite of claim 11, wherein the composite exhibits a 0.50 cal FSP $V_{50}$ value of at least about 1200 fps at an areal density of about 4.8-4.9 lb/ft$^2$ and a thickness of about 13-13.5 mm when measured by the U.S. Department of Defense Test Method Standard for $V_{50}$ Ballistic Test for Armor, MIL-STD-662F, December 1997.

14. The composite of claim 11, wherein the polymeric resin comprises an epoxy resin.

15. The composite of claim 11, wherein the polymeric resin comprises at least one of polyethylene, polypropylene, polyamide, polybutylene terephthalate, polycarbonate, thermoplastic polyurethane, phenolic, polyester, vinyl ester, and thermoset polyurethane resins.

16. The composite of claim 11, wherein the at least one of the plurality of glass fibers is at least partially coated with a sizing composition.

17. The composite of claim 11, wherein the plurality of glass fibers are arranged to form a fabric.

18. The composite of claim 17, wherein the plurality of glass fibers are woven to form the fabric.

19. The composite of claim 17, wherein the fabric comprises a plain weave fabric, a twill fabric, a crowfoot fabric, a satin weave fabric, a stitch bonded fabric, or a 3D woven fabric.

20. An armor panel comprising the composite of claim 17.

21. The composite of claim 1, wherein the $Li_2O$ content is greater than either the $Na_2O$ content or the $K_2O$ content.

22. The composite of claim 11, wherein the $Li_2O$ content is greater than either the $Na_2O$ content of the $K_2O$ content.

* * * * *

UNITED STATES PATENT AND TRADEMARK OFFICE
CERTIFICATE OF CORRECTION

PATENT NO. : 9,056,786 B2  Page 1 of 1
APPLICATION NO. : 13/232576
DATED : June 16, 2015
INVENTOR(S) : James Carl Peters et al.

It is certified that error appears in the above-identified patent and that said Letters Patent is hereby corrected as shown below:

In the Claims

Column 40 Line 14, Please delete "53.5-77 weight percent;" please insert -- 60-77 weight percent; --

Column 40 Line 15, Please delete "4.5-14.5 weight percent;" please insert -- 7-12 weight percent; --

Signed and Sealed this
Seventeenth Day of November, 2015

Michelle K. Lee
*Director of the United States Patent and Trademark Office*